US012481242B2

(12) United States Patent
Kageyama et al.

(10) Patent No.: US 12,481,242 B2
(45) Date of Patent: Nov. 25, 2025

(54) DUCT UNIT AND IMAGE FORMING APPARATUS

(71) Applicant: CANON KABUSHIKI KAISHA, Tokyo (JP)

(72) Inventors: Chiharu Kageyama, Ibaraki (JP); Masaki Kakitani, Chiba (JP); Rin Ishikawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/779,622

(22) Filed: Jul. 22, 2024

(65) Prior Publication Data

US 2025/0036076 A1 Jan. 30, 2025

(30) Foreign Application Priority Data

Jul. 24, 2023 (JP) ................................ 2023-120326

(51) Int. Cl.
*G03G 21/00* (2006.01)
*F24F 13/00* (2006.01)
(Continued)

(52) U.S. Cl.
CPC ........... *G03G 21/206* (2013.01); *F24F 13/24* (2013.01); *G10K 11/168* (2013.01); *F24F 2013/242* (2013.01); *G03G 2221/1645* (2013.01)

(58) Field of Classification Search
CPC ........... G03G 21/206; G03G 2221/1645; B41J 29/377; H02B 1/56; H02B 1/565;
(Continued)

(56) References Cited

U.S. PATENT DOCUMENTS 3,726,359 A * 4/1973 Dierl ....................... F24F 13/24 181/224
5,152,366 A * 10/1992 Reitz ......................... F01N 1/00 181/252
(Continued)

FOREIGN PATENT DOCUMENTS

JP H06167982 A 6/1994
JP 06331208 A * 11/1994
(Continued)

*Primary Examiner* — Robert B Beatty
(74) *Attorney, Agent, or Firm* — Canon U.S.A., Inc. IP Division

(57) ABSTRACT

A first sound absorbing member is disposed outside a fan connecting duct connected to an image-formation exhaust fan. The first sound absorbing member includes a first-layer perforated plate having a plurality of sound absorbing holes and a second-layer sound absorbing sheet covering the plurality of sound absorbing holes. The first sound absorbing member provides the effect of reducing airflow noise generated by the operation of the image-formation exhaust fan. When part of the airflow noise passes through the sound absorbing holes of the first-layer perforated plate, part of the sound energy is converted to thermal energy, thereby reducing the airflow noise. Part of the sound energy of the sound that has passed through the sound absorbing holes is further converted to thermal energy by the second-layer sound absorbing sheet, thereby further reducing the airflow noise. The first sound absorbing member may be disposed in a small space.

27 Claims, 26 Drawing Sheets

(51) Int. Cl.

| | |
|---|---|
| ***F24F 13/24*** | (2006.01) |
| ***G03G 21/20*** | (2006.01) |
| ***G10K 11/168*** | (2006.01) |

(58) Field of Classification Search

CPC ..... H05K 7/20145; G10K 11/168; F24F 7/04; F24F 7/06; F24F 13/02; F24F 13/24; F24F 2013/242

USPC ....... 399/92; 454/234; 361/679.49, 690, 695

See application file for complete search history.

(56) References Cited

U.S. PATENT DOCUMENTS

| | | | | | |
|---|---|---|---|---|---|
| 5,696,361 | A * | 12/1997 | Chen | E04F 17/04 181/256 |
| 5,821,473 | A * | 10/1998 | Takahashi | F01N 13/18 181/252 |
| 8,231,331 | B2 * | 7/2012 | Wu | F04D 29/422 415/206 |
| 12,078,957 | B2 * | 9/2024 | Nojima | G03G 21/206 |
| 2013/0188984 | A1 * | 7/2013 | Rodriguez | G03G 21/20 399/92 |
| 2018/0202464 | A1 * | 7/2018 | Soutar | F04D 29/664 |
| 2021/0140678 | A1 * | 5/2021 | Lee | F16L 55/0336 |
| 2023/0064984 | A1 * | 3/2023 | Cook | F16L 55/0336 |
| 2024/0011652 | A1 * | 1/2024 | Hakuta | F24F 13/24 |
| 2024/0132218 | A1 * | 4/2024 | Bires | B32B 1/08 |

FOREIGN PATENT DOCUMENTS

| | | | | |
|---|---|---|---|---|
| JP | H08156367 | A | 6/1996 | |
| JP | 2005292620 | A | 10/2005 | |
| JP | 2007170737 | A | 7/2007 | |
| KR | 200423368 | Y1 * | 8/2006 | F24F 13/24 |
| KR | 20120008392 | U * | 12/2012 | F24F 13/081 |
| KR | 20140005981 | U * | 12/2014 | F24F 13/0245 |

* cited by examiner

DUCT UNIT AND IMAGE FORMING APPARATUS

BACKGROUND

Field

The present disclosure relates to image forming apparatuses, such as printers, copying machines, and fax machines.

Description of the Related Art

Image forming apparatuses include a fan and a tubular duct for sending air into a casing. The duct connects the fan with a corona charger that produces ozone, a developing device that produces scattered toner, a fuser that produces high temperature, a power source, or another device to form an air channel through which airflow generated by the fan passes. For example, by sending air to the corona charger, the ozone generated by the charging of the photosensitive drum is carried by the airflow to the filter for collection. By generating airflow in the casing, the heat caused by the operation can be discharged outside the machine or dispersed in the casing.

Japanese Patent Laid-Open No. 8-156367 discloses a method for reducing the airflow noise using multiple ducts with different lengths or a duct including a hollow-tube-like side branch that is closed at one end and by making the noises passing therethrough interfere with each other.

SUMMARY

A duct unit according to a first aspect of the present disclosure includes a fan configured to generate airflow, a duct including a tubular main body that forms an air channel through which the airflow generated by the fan passes, and a first sound absorbing member disposed outside the tubular main body along at least part of the air channel of the tubular main body. The first sound absorbing member includes a first layer and a second layer disposed on the first layer in a direction perpendicular to an outer surface of the tubular main body. The first layer is disposed between the second layer and the outer surface of the tubular main body. The second layer has a sound absorbing property different from a sound absorbing property of the first layer.

A duct unit according to a second aspect of the present disclosure includes a fan configured to generate airflow, a duct including a tubular main body that forms an air channel through which the airflow generated by the fan passes, and a first sound absorbing member disposed outside the fan. The first sound absorbing member includes a first layer and a second layer disposed on the first layer in a direction perpendicular to an outer surface of the tubular main body. The first layer is disposed between the second layer and the outer surface of the tubular main body. The second layer has a sound absorbing property different from a sound absorbing property of the first layer.

A duct unit according to a third aspect of the present disclosure includes a fan configured to generate airflow, a duct including a tubular main body that forms an air channel through which the airflow generated by the fan passes, and a first sound absorbing member disposed outside the tubular main body along at least part of the air channel of the tubular main body. The tubular main body includes a recessed wall having a plurality of recesses which are not penetrating thought the recessed wall. The first sound absorbing member is disposed outside the recessed wall.

Further features of the present disclosure will become apparent from the following description of exemplary embodiments with reference to the attached drawings.

DESCRIPTION OF THE EMBODIMENTS

The inventor has found that further miniaturization of the image forming apparatuses are desirable. Along with this, the inventor has found the problem of limited space for the fan and the duct in the image forming apparatuses.

The inventor has devised a method of using multiple ducts with different lengths or a duct with a side branch as one embodiment. However, the use of multiple ducts with different lengths or a duct with a side branch may require a relatively large space. For this reason, the inventor has devised some more embodiments. Some embodiments of this disclosure may provide image forming apparatuses capable of satisfying the miniaturization of the apparatus and the reduction of airflow noise produced by the operation of the fan.

First Embodiment

Image Forming System

This embodiment will be described hereinbelow. An image forming apparatus according to this embodiment will be described with reference to FIG. 1 and FIGS. 2A and 2B.

Figure 1:
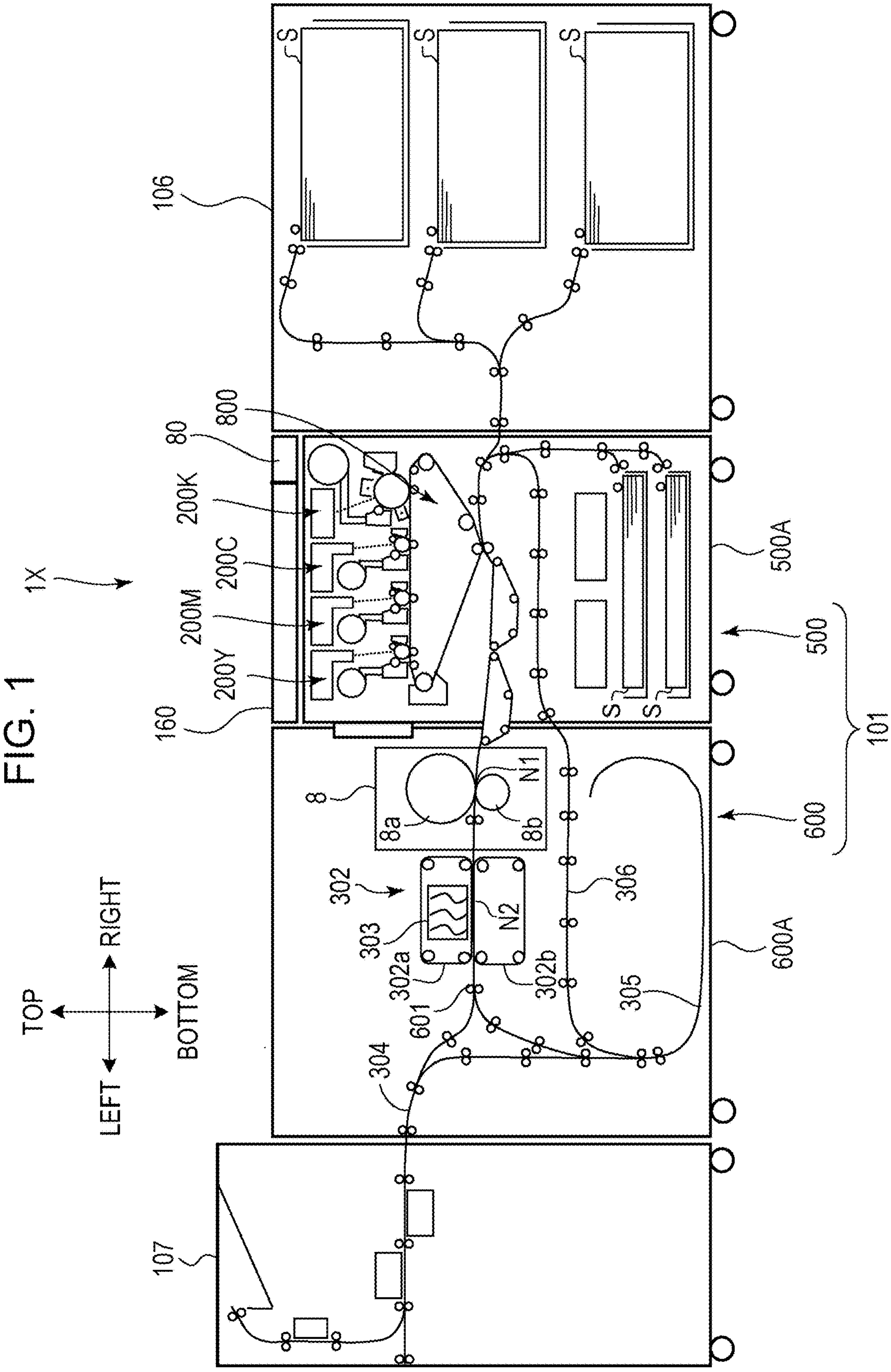
FIG. 1 is a schematic diagram illustrating an image forming apparatus according to an embodiment of the present disclosure.

An image forming system 1X illustrated in FIG. 1 includes an image forming apparatus 101, a large-capacity feeding device 106 including multiple printing medium containers, and a sensing device 107. The sensing device 107 is disposed downstream from the image forming apparatus 101 in the conveying direction of printing media S by the large-capacity feeding device 106 (from the right to left in FIG. 1).

In this specification, the side on which the user stands when operating an operating section 80 (described later) is referred to as the "front", and the opposite side is referred to as the "back (or rear)". The left side when viewed from the front is referred to as the "left", and the right side when viewed from the front is referred to as the "right". Accordingly, FIG. 1 illustrate the image forming system 1X viewed from the front.

The large-capacity feeding device 106 and the sensing device 107 are not only physically connected to the image forming apparatus 101 so as to allow the conveyance of the printing media S but also electrically connected to allow the transmission and reception of electrical signals. The large-capacity feeding device 106 is a device for supplying the printing media S to the image forming apparatus 101. The sensing device 107 is a device for reading fixed toner images formed on one side or both sides of the printing media S discharged from the image forming apparatus 101 and feeding back image signals to the image forming apparatus 101. The image forming apparatus 101 detects the image density and the misalignment of the image position based on the fed-back image signals and corrects the image data based on the detected image density and misalignment of the image position. The image forming apparatus 101 forms a toner image on the printing media S by controlling image forming stations 200Y, 200M, 200C, and 200K based on the corrected image data.

Instead of the large-capacity feeding device 106, a manual feeding device or a long feeding device configured to contain long printing media S (not shown) may be selectively connected upstream in the printing medium conveying direction of the image forming apparatus 101. Alternatively, an additional large-capacity feeding device, a manual feeding device, and a long feeding device (not shown) may be selectively connected in series upstream from the large-capacity feeding device 106. The image forming apparatus 101 or the sensing device 107 may selectively connect to one or multiple sets of an inserter, a puncher, a case binder, a large-capacity stacker, a folding machine, a finisher, a trimmer, and other various post-processing devices (not shown) downstream therefrom. By selectively connecting various optional devices upstream and downstream of the image forming apparatus 101 in this manner, variously post-processed printing media S can be output in-line, thereby allowing the image forming system 1X to achieve high production, high quality, high stability, and high functionality.

Image Forming Apparatus

The image forming apparatus 101 is roughly divided into an image-forming transfer device 500 and a fixing conveying device 600 separately formed. In this embodiment, the image-forming transfer device 500 serving as image forming means includes the image forming stations 200Y, 200M, 200C, and 200K and an intermediate-transfer belt unit 800 for achieving processing up to a transfer process for transferring toner images onto the printing media S. In contrast, the fixing conveying device 600 includes a fuser 8 and a cooler 302 for achieving a fixing process for fixing the toner images onto the printing media S. The image-forming transfer device 500 and the fixing conveying device 600 are connected so as to allow for transferring the printing media S.

The image-forming transfer device 500 and the fixing conveying device 600 include independent casings 500A and 600A, respectively, and can be moved by respective casters. This allows the image-forming transfer device 500 and the fixing conveying device 600, even if they are large-sized devices, to be packed or transported, with the casing 500A and the casing 600A separated, improving the workability for installation. The casing 500A contains a document scanning apparatus 160 for scanning the image information of the document, a display capable of displaying a variety of information, and an operating section 80 including keys capable of inputting a variety of information according to a user operation.

The casing 500A and the casing 600A each include a front plate on the front side, a rear plate provided on the back and supporting the image forming stations 200Y to 200K, the intermediate-transfer belt unit 800, the fuser 8, the cooler 302, etc. together with the front plate, and multiple frames including support columns for connecting the front plate and the rear plate or supporting the front plate. The casing 500A and the casing 600A are equipped with resin-made outer covers that constitute the exterior. The image-forming transfer device 500 and the fixing conveying device 600 may be disposed not in the separate casings (500A and 600A) but in a single casing.

Image-Forming Transfer Device

Figure 2A:
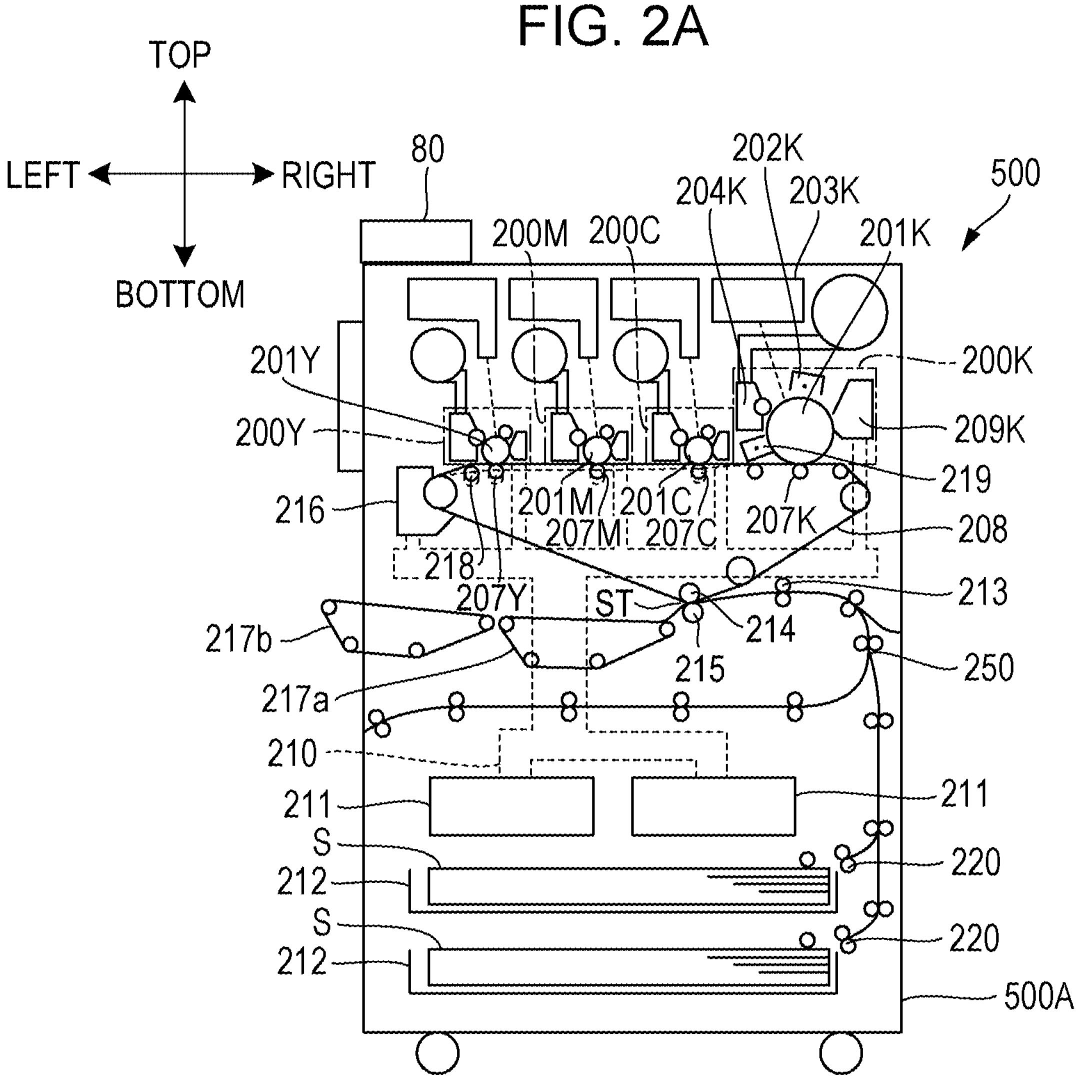
FIG. 2A is a cross-sectional view of an image-forming transfer device.
Figure 2B:
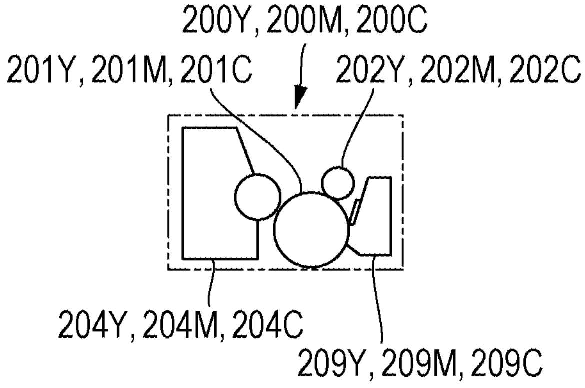
FIG. 2B is an enlarged view of an image forming station.

Next, the image-forming transfer device 500 will be described with reference to FIGS. 2A and 2B. The image-forming transfer device 500 serving as an image forming unit is an intermediate transfer device in which the image forming stations 200Y, 200M, 200C, and 200K for forming yellow, magenta, cyan, black toner images, respectively, are opposed to an intermediate transfer belt 208 in the casing 500A. The image-forming transfer device 500 forms toner images on the printing media S according to image data from a document scanning apparatus 160 provided above the casing 500A (see FIG. 1) or an external device (not shown) such as a personal computer. Examples of the printing media S include paper, plastic film, cloth, and other sheet materials.

The conveying process for the printing media S by the conveying process image-forming transfer device 500 will be described. The printing media S are contained in one or more (in this case, two) cassettes 212 in a stacked state and are supplied one by one by a supply roller 220 at the timing of image formation. The printing media S supplied by the supply roller 220 are conveyed to a registration roller 213 disposed at an intermediate point of a conveying path 250. At the registration roller 213, the printing media S undergo skey correction and timing correction, and the printing media S are conveyed to a secondary transfer portion ST. The secondary transfer portion ST is a transfer nip portion formed by a secondary transfer internal roller 214 and a secondary transfer external roller 215 opposed with the intermediate transfer belt 208 therebetween, where the toner images are transferred from the intermediate transfer belt 208 onto the printing media S under a predetermined pressure and a secondary transfer voltage.

A process for forming images conveyed to the secondary transfer portion ST at the timing similar to the process of conveying the printing medium S to the secondary transfer portion ST will be described. First, the image forming stations 200Y to 200K will be described. Since the image forming stations 200Y to 200K of the individual colors are basically the same, the black image forming station 200K will be described as a representative example.

The image forming station 200K includes a photosensitive drum 201K, a charger 202K, a laser scanner 203K, and a developing device 204K. The surface of the rotating photosensitive drum 201K is uniformly charged in advance by the charger 202K, and then an electrostatic latent image is formed on the surface by the laser scanner 203K driven based on the image data. Next, the developing device 204K develops the electrostatic latent image formed on the photosensitive drum 201K with a toner contained in a developer to form a toner image on the photosensitive drum 201K.

Thereafter, the toner image formed on the photosensitive drum 201K is primarily transferred onto the intermediate transfer belt 208 by a predetermined pressure and a primary transfer voltage applied by a primary transfer roller 207K, which is opposed to the image forming station 200K with the intermediate transfer belt 208 therebetween. A primary transfer residual toner remaining on the photosensitive drum 201K after the primary transfer is removed by a drum cleaner 209K. The removed primary transfer residual toner is collected in a collected toner container 211 through a toner collection path 210.

The intermediate transfer belt 208 is an endless belt that is stretched by multiple tension rollers and the secondary transfer internal roller 214 and moved by a motor or the like (not shown) at a speed corresponding to the rotation speed of the photosensitive drums 201Y to 201K. The color-image forming processes performed in parallel by the individual color image forming stations 200Y to 200K are performed at the timing at which the color toner images that are primarily transferred onto the intermediate transfer belt 208 upstream in the moving direction are overlapped in sequence. As a result, a full-color toner image is finally formed on the intermediate transfer belt 208 and is conveyed to the secondary transfer portion ST. A secondary transfer residual toner remaining on the intermediate transfer belt 208 after the full-color toner image passes through the secondary transfer portion ST is collected from the intermediate transfer belt 208 by a belt cleaner device 216. The primary transfer rollers 207Y to 207K, the intermediate transfer belt 208, the multiple tension rollers, the secondary transfer internal roller 214, and the belt cleaner device 216 may be integrated as the intermediate-transfer belt unit 800.

With the conveying process and the image forming process, the timing of the printing medium S and the timing of the toner image are synchronized at the secondary transfer portion ST, and the secondary transfer in which the toner image is transferred from the intermediate transfer belt 208 to the printing medium S is performed. Thereafter, the printing medium S is conveyed to the fixing conveying device 600 by pre-fixation conveying belts 217*a* and 217*b*, and the fixing conveying device 600 fixes the toner image onto the printing medium S.

The image-forming transfer device 500 may form a monochrome image using only the black image forming station 200K, in addition to forming a full-color image using all the image forming stations 200Y to 200K. In forming a monochrome image, the primary transfer rollers 207Y to 207C and a primary transfer auxiliary roller 218 are displaced vertically downward by a separating mechanism (not shown). This separates the photosensitive drums 201Y to 201C from the intermediate transfer belt 208, thereby stopping the image forming stations 200Y to 200C. Stopping the image forming stations 200Y to 200C in this way prevents wear of components due to unnecessary operation, thereby extending the lifespan of the image forming stations 200Y to 200C.

In the image forming station 200K, which is not separated from the intermediate transfer belt 208, the photosensitive drum 201K has a larger diameter suitable for a longer lifespan than the photosensitive drums 201Y to 201C. The charger 202K of the image forming station 200K is a non-contact corona charger, while the respective chargers 202Y to 202C of the image forming stations 200Y to 200C are contact roller chargers using a charging roller. For this reason, for users who use monochrome image formation frequently, the maintenance interval of the frequently used image forming station 200K is not shorter than but substantially the same as the maintenance interval of the less frequently used image forming stations 200Y to 200C. The large-diameter drum configuration using the corona charger may make the charge width in the rotation axis direction of the photosensitive drum larger than the small-diameter drum configuration using the roller charger, which is suitable for high-speed charging, thereby improving the productivity in monochrome image formation.

In the image-forming transfer device 500 in which the image forming stations 200Y to 200C and the image forming station 200K have partly different configurations, the amounts of charged toner of the photosensitive drums 201Y to 201C and the photosensitive drum 201K may differ due to the difference in shape and wear volume. The difference in toner charging amount may cause ununiform transfer of the toner image from the intermediate transfer belt 208 to the printing medium S to cause transfer failures in the secondary transfer process. For this reason, the photosensitive drum 201K is equipped with a pre-transfer charger 219 constituted of a corona charger to make the toner charging amount equal to the toner charging amounts of the photosensitive drums 201Y to 201C. The pre-transfer charger 219 performs charge control (specifically, charging) on the photosensitive drum 201K before the toner image reaches a transfer nip portion formed by the photosensitive drum 201K and the primary transfer roller 207K to make the toner charging amount of the toner image formed on the photosensitive drum 201K uniform.

The above configuration allows the image-forming transfer device 500 to achieve high production, high quality, high stability, and long lifespan not only in full-color image formation but also in monochrome image formation.

Fixing Conveying Device

Next, the fixing conveying device 600 will be described. As illustrated in FIG. 1, the fixing conveying device 600 includes the fuser 8 and the cooler 302. The fuser 8 includes a fixing roller 8*a* heated by a heater (not shown) and a pressure roller 8*b* that presses the printing medium S against the fixing roller 8*a*. The printing medium S on which a toner image conveyed from the image-forming transfer device 500 is formed is heated and pressed while being conveyed and nipped by a fixing nip portion N1 formed by the fixing roller 8*a* and the pressure roller 8*b*. This fixes the toner image to the printing medium S.

Here, the fuser 8 is constituted of a roller pair of the fixing roller 8*a* and the pressure roller 8*b*. This is illustrative only. Another example is a fuser that includes a fixing belt instead of the fixing roller 8*a* and that heats and presses the printing medium S while conveying and nipping the printing medium S at a fixing nip formed by the fixing belt heated by a heater and the pressure roller 8*b* to fix the toner image on the printing medium S.

The printing medium S heated by the fuser 8 is conveyed toward the cooler 302. The cooler 302 includes cooling belts 302*a* and 302*b* and a heat sink 303. The cooling belts 302*a* and 302*b* are in contact with each other to form a cooling nip portion N2 where the printing medium S is nipped and conveyed. The heat sink 303 is disposed in contact with the inner peripheral surface of the cooling belt 302*a* to cool the cooling belt 302*a*. This cools the printing medium S heated by the fuser 8 while the printing medium S is nipped and conveyed by the cooling nip portion N2.

The printing medium S cooled by the cooler 302 is nipped and conveyed by a pair of cooling outlet rollers 601. In the case of a one-sided mode in which a toner image is formed only on one side of the printing medium S, the printing medium S cooled by the cooler 302 is guided to a discharge conveying path 304 and is discharge from the casing 600A toward the sensing device 107. In the case of a double-sided mode in which a toner image is formed on both sides of the printing medium S, the printing medium S cooled by the cooler 302 is reversed inside out through a reversing conveying path 305 and then returned to the image-forming transfer device 500 through a double-sided conveying path 306. Thereafter, the printing medium S undergoes the same process as in the single-sided mode, and a toner image is formed on the other side by the fuser 8. After being cooled by the cooler 302, the printing medium S is guided to the discharge conveying path 304 and finally discharged from the casing 600A toward the sensing device 107.

Airflow Unit

Figure 3:
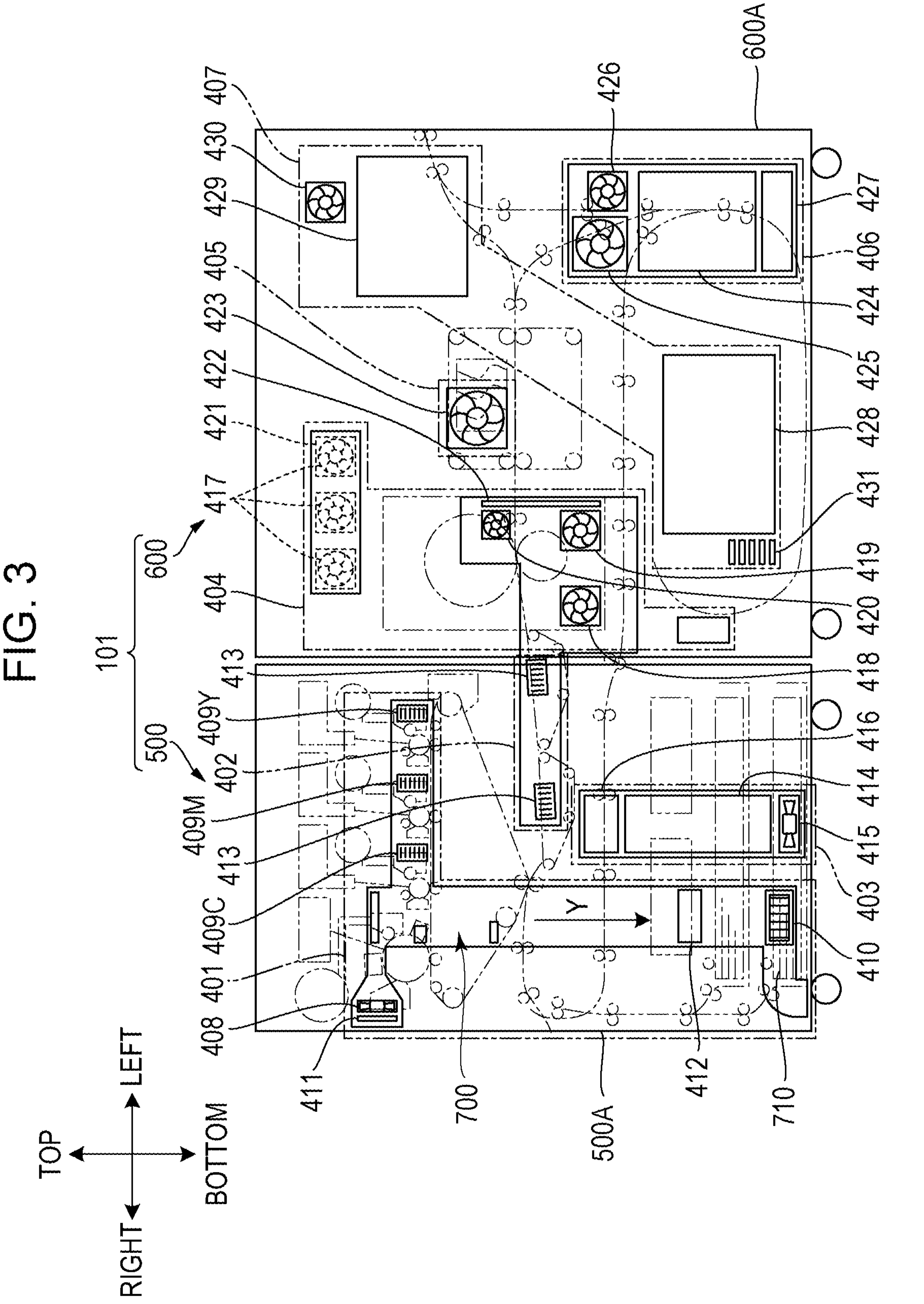
FIG. 3 is a back view of airflow units.
Figure 4A:
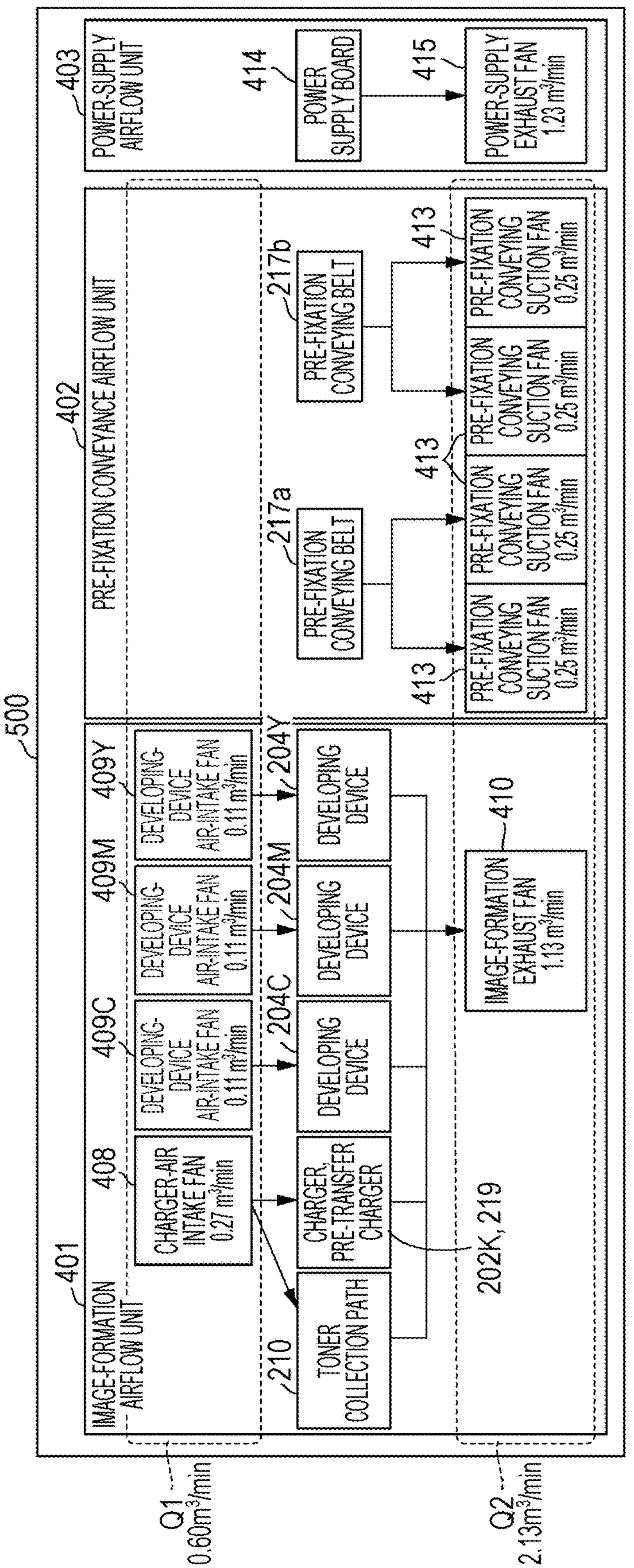
FIGS. 4A and 4B are block diagrams illustrating air capacities according to an embodiment.
Figure 4B:
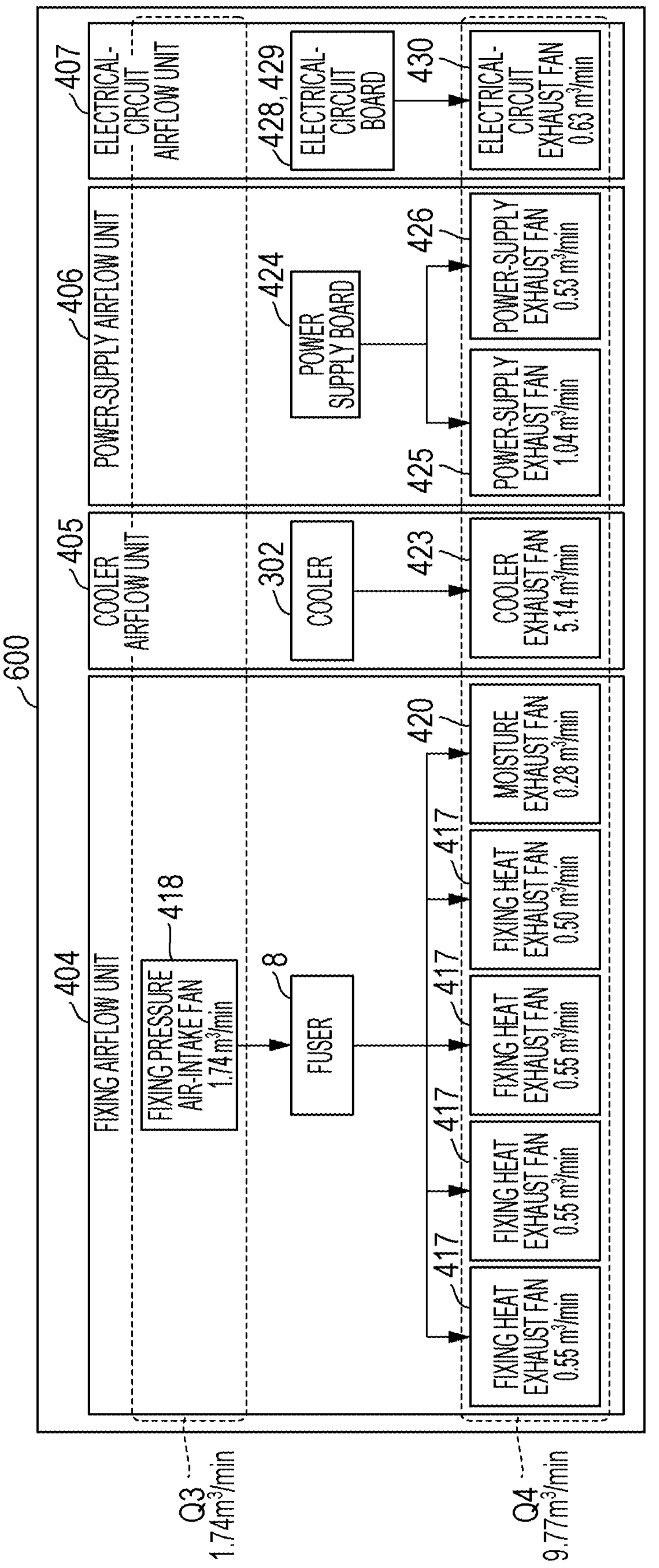

Next, airflow units disposed in the casings 500A and 600A of the image forming apparatus 101 to blow air will be described using FIG. 3 and FIGS. 4A and 4B with reference to FIG. 1 and FIGS. 2A and 2B. First, the airflow units of the image-forming transfer device 500 will be described. As illustrated in FIG. 3, the image-forming transfer device 500 includes an image-formation airflow unit 401, a pre-fixation conveyance airflow unit 402, and a power-supply airflow unit 403.

The image-formation airflow unit 401 includes a charger air-intake fan 408, developing-device air-intake fans 409Y, 409M, and 409C, an image-formation exhaust fan 410, and a duct unit 700. The charger air-intake fan 408 supplies outside air for ventilation to the charger 202K. The charger air-intake fan 408 includes, at the intake port, a charger air-intake filter 411 for collecting powder dust floating in the outside air to supply cleaned air to the charger 202K. The air capacity of the charger air-intake fan 408 is, for example, 0.27 $m^3$/min.

The developing-device air-intake fans 409Y, 409M, and 409C supply outside air for cooling to the developing devices 204Y, 204M, and 204C. The air capacity of the developing-device air-intake fans 409Y to 409C is, for example, 0.11 $m^3$/min.

The image-formation exhaust fan 410 discharges ozone, which is a discharge substance, generated by corona discharge performed by the charger 202K and the pre-transfer charger 219 from the image forming station 200K. The image-formation exhaust fan 410 also discharges the heat generated in the developing devices 204Y, 204M, and 204C due to the friction during the rotation from the image forming stations 200Y, 200M, and 200C. The image-formation exhaust fan 410 also discharge heat stagnating in the image forming stations 200Y, 200M, and 200C through the toner collection path 210. This embodiment uses polyester resin as a toner binder resin, and if the temperature in the vicinity of the developing devices 204Y to 204C reaches 40° C. or more, an image defect may occur, and if the temperature in the vicinity of the toner collection path 210 reaches 45° C. or more, toner clogging may occur. For the reason, this embodiment discharges the heat to bring the temperature in the vicinity of the developing devices 204Y to 204C to 40° C. or less and the temperature in the vicinity of the toner collection path 210 to 45° C. or less. Furthermore, the image-formation exhaust fan 410 discharges the toner that has scattered in the image forming process from the image forming stations 200Y to 200K. The air capacity of the image-formation exhaust fan 410 is, for example, 1.13 $m^3$/min. The air capacity of the image-formation exhaust fan 410 is larger than a total air capacity Q1 of 0.60 $m^3$/min of the charger air-intake fan 408 and the developing-device air-intake fans 409Y, 409M, and 409C.

An image-formation discharge filter 412 for collecting the ozone and the scattered toner discharged from the image forming stations 200Y to 200K is disposed upstream in the airflow direction of the image-formation exhaust fan 410 (in the direction of arrow Y). Collecting the ozone and the scattered toner with the image-formation discharge filter 412 prevents the ozone and the scattering toner zone from being discharged outside the casing 500A.

In this embodiment, the airflows generated by the charger air-intake fan 408, the developing-device air-intake fans 409Y to 409C, and the image-formation exhaust fan 410 are discharged outside the casing 500A through a tubular duct unit 700 provided in the casing 500A. The image-formation discharge filter 412 is disposed in the duct unit 700. The duct unit 700 will be described later (see FIGS. 6 and 7).

The image-formation airflow unit 401 allows for efficiently discharging the ozone, the scattered toner, and the heat outside the casing 500A without stagnating in the casing 500A. This prevents charge failures such as charge variations due to ozone and scattered toner adhering to the photosensitive drums or the chargers, development defects caused by a decrease in flowability of the toner due to overheating, operation failures such as toner conveying path clogging, transfer failures caused by ozone and scattered toner adhering to the pre-transfer charger 219, and other failures.

The pre-fixation conveying belts 217*a* and 217*b* are each equipped with a pre-fixation conveying suction fan 413 on their inner peripheries to suck the printing medium S to the outer peripheral surfaces of the pre-fixation conveying belts 217*a* and 217*b* via suction ports directed to the pre-fixation conveying belts 217*a* and 217*b*. For example, two pre-fixation conveying suction fans 413 are arranged in the conveying direction for each of the pre-fixation conveying belts 217*a* and 217*b*, making a total of four fans. These pre-fixation conveying suction fans 413 constitute the pre-fixation conveyance airflow unit 402. The pre-fixation conveying suction fans 413 are adjusted to an optimum air capacity according to the material and shape of the conveyed printing media S by a control circuit (not shown). This configuration allows for stable conveyance of printing media S made of various materials without disordering the pre-fixed toner images on the printing media S. The air capacity of the pre-fixation conveying suction fans 413 is, for example, 0.25 $m^3$/min.

The power-supply airflow unit 403 includes a power-supply exhaust fan 415 for exhausting the heat generated in a power supply board 414 outside the casing 500A. As the power-supply exhaust fan 415 operates, outside air for cooling is supplied through a power-supply intake port 416 to cool the power supply board 424 efficiently. This configuration prevents malfunctions and failures of the image-forming transfer device 500 due to a decrease in output caused by the overheating of the power supply board 414. The air capacity of the power-supply exhaust fan 415 is, for example, 1.23 $m^3$/min.

Next, the airflow unit of the fixing conveying device 600 will be described. As illustrated in FIG. 3, the fixing conveying device 600 includes a fixing airflow unit 404, a cooler airflow unit 405, a power-supply airflow unit 406, and an electrical-circuit airflow unit 407. The fixing airflow unit 404 includes fixing heat exhaust fans 417, a fixing pressure air-intake fan 418, a fixing pressure exhaust fan 419, and a moisture exhaust fan 420.

The fixing heat exhaust fans 417 mainly exhaust the heat generated in the fixing roller 8*a* of the fuser 8 outside the casing 600A. In this embodiment, three fixing heat exhaust fans 417 are arranged in the lateral direction. If the components of the fuser 8 or a mold release agent (for example, wax) contained in the toner is heated, volatile organic compounds (VOCs), ultra fine particles (UFPs), and other substances may be produced. For this reason, a fixation upper exhaust filter 421 for collecting the VOCs, UFPs, etc. is disposed downstream of the airflow generated by the fixing heat exhaust fans 417 (in this case, on the back). The air capacity of the fixing heat exhaust fans 417 is, for example, 0.55 $m^3$/min.

The fixing pressure air-intake fan 418 supplies outside air for cooling to the pressure roller 8*b* of the fuser 8. The fixing pressure exhaust fan 419 discharge the heat generated in the pressure roller 8*b* of the fuser 8 outside the casing 600A. The moisture exhaust fan 420 discharges water vapor which can be generated when the printing media S containing moisture are heated by the fuser 8 outside the casing 600A. The air capacity of the fixing pressure air-intake fan 418 is, for example, 1.74 $m^3$/min, and the air capacity of the fixing pressure exhaust fan 419 is, for example, 0.50 $m^3$/min. The air capacity of the moisture exhaust fan 420 is, for example, 0.28 $m^3$/min.

A fixation lower exhaust filter 422 for collecting the VOCs, UFPs, etc. is disposed downstream of the airflow generated by the fixing pressure exhaust fan 419 and the moisture exhaust fan 420 (in this case, on the left).

The pre-fixation conveying suction fans 413 may suck the VOCs, UFPs, etc. from the casing 600A into the casing 500A. For this reason, this embodiment is configured to collect the VOCs, UFPs, etc. in the air sucked by the pre-fixation conveying suction fans 413 with the fixation lower exhaust filter 422.

The configuration of the fixing airflow unit 404 allows for efficiently discharging the heat, moisture, VOCs, UFPs, etc. generated in the fixing process outside the casing 600A without stagnating them in the casing 600A. In other words, this configuration prevents fixing failures and malfunction due to an increase in the temperature of the toner and components caused by the heat stagnating in the casing 600A.

This configuration also prevents fixing failures due to excessive heat applied to the toner during the fixing process caused by the overheating of the pressure roller 8*b* of the fuser 8 or the separation failures of the printing media S from the fixing roller 8*a* and the pressure roller 8*b*. This configuration also prevents conveying failures and fixing failures due to dew condensation on a conveyance guide (not shown) caused by the adhesion of water vapor or adhesion of the condensed water drops to the printing media S being conveyed. Furthermore, this configuration prevents malfunction and conveyance failures due to a mold release agent (wax) that is vaporized due to heating and then re-solidified, adhering to the components, etc.

The cooler airflow unit 405 includes a cooler exhaust fan 423 for exhausting the heat released from the heat sink 303 of the cooler 302 outside the casing 600A. The heat sink 303 of the cooler 302 is a heat exchanger that absorbs heat from the printing media S after fixation via the cooling belt 302*a* and releases the absorbed heat. This configuration efficiently cools the printing media S heated by the fuser 8, thereby reducing the amount of heat released from the printing media S on the conveying paths 304, 305, and 306 (see FIG. 1). In other words, this configuration prevents the image defects and malfunction due to the overheating of the toner due to the heat released from the printing media S. Furthermore, this configuration prevents the printing media S from sticking to each other with the toner when a large amount of printed media S are stacked in a post-processing device (in this case, the sensing device 107).

The power-supply airflow unit 406 includes power-supply exhaust fans 425 and 426 for discharging the heat generated in the power supply board 424 outside the casing 600A. As the power-supply exhaust fans 425 and 426 exhausts air, cooling air is supplied through a power-supply intake port 427, efficiently cooling the power supply board 424. This configuration prevents malfunction and failures caused by a decrease in output due to the overheating of the power supply board 424.

The electrical-circuit airflow unit 407 includes an electrical-circuit exhaust fan 430 that discharges the heat generated in electrical-circuit boards 428 and 429 outside the casing 600A. As the electrical-circuit exhaust fan 430 exhausts air, cooling air is supplied through electrical-circuit air-intake ports 431, efficiently cooling the electrical-circuit boards 428 and 429. This configuration prevents malfunction and failures caused by a decrease in output due to the overheating of the electrical-circuit boards 428 and 429.

Duct Unit

Figure 5A:
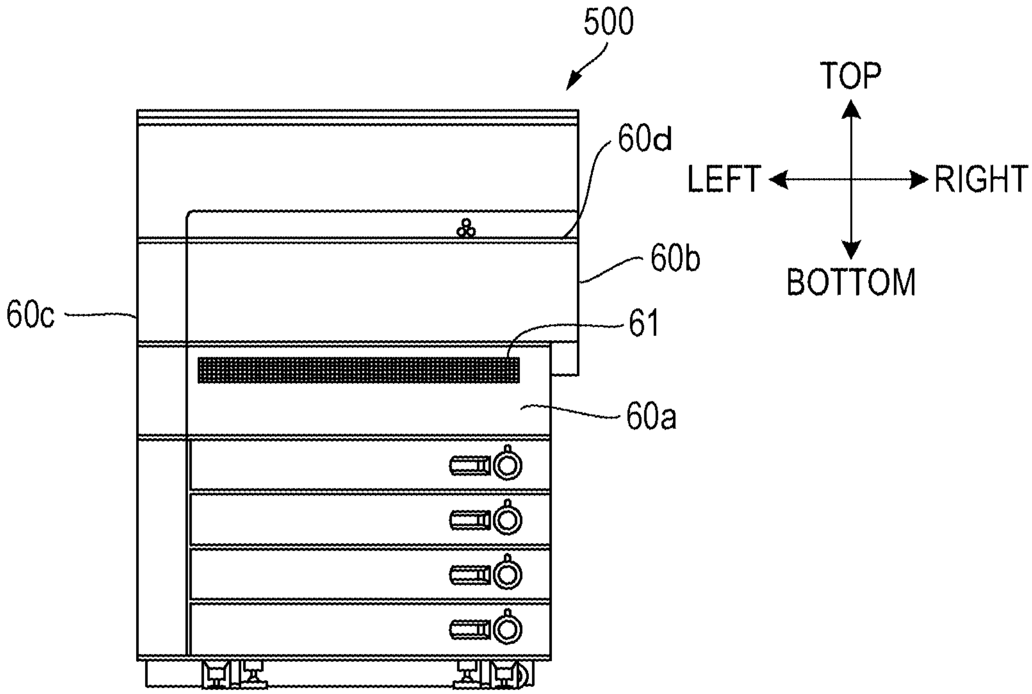
FIG. 5A is a front view of the image-forming transfer device illustrating the appearance thereof.
Figure 5B:
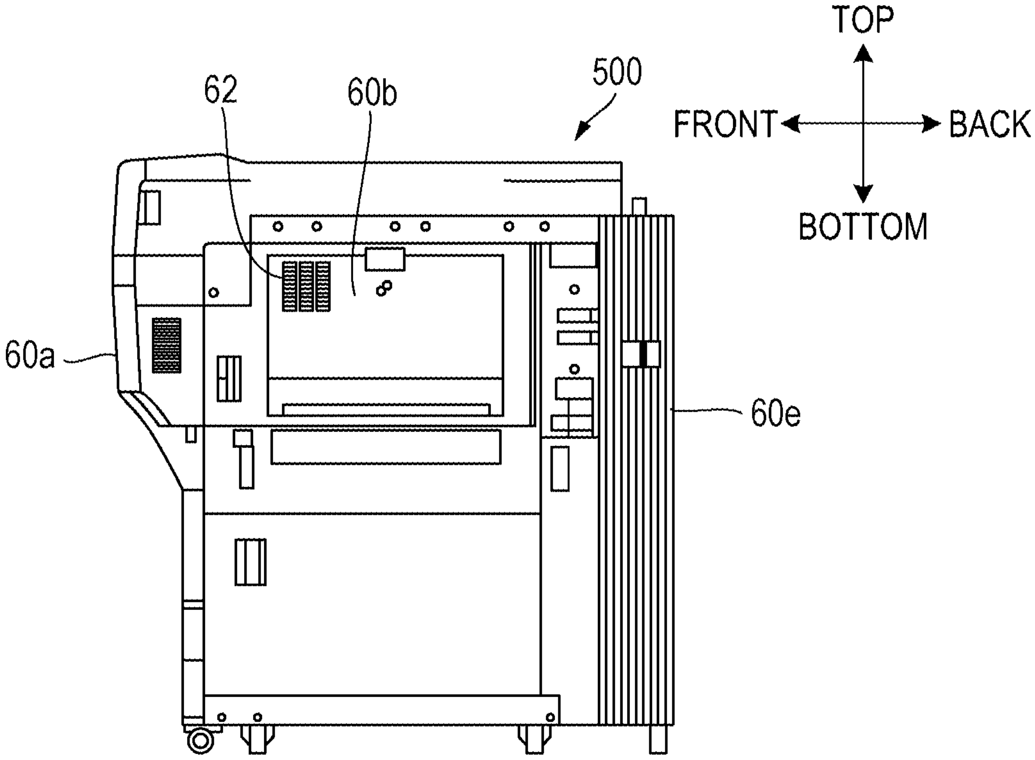
FIG. 5B is a right side view of the image-forming transfer device.

The duct unit 700 will be described using FIGS. 5A and 5B to FIG. 7 with reference to FIGS. 2A and 2B and FIG. 3. As illustrated in FIGS. 5A and 5B, the casing 500A is equipped with resin-made exterior covers 60*a* to 60*e* covering the casing 500A to constitute the exterior. In this embodiment, the exterior covers include a front cover 60*a* at the front, a right cover 60*b* at the right side, a left cover 60*c* at the left side, a top cover 60*d* at the top, and a back cover 60*e* at the back side. To bring air into the casing 500A, the front cover 60*a* includes an intake port 61, and the right cover 60*b* includes an intake port 62.

The developing-device air-intake fans 409Y to 409C described above draw air from outside the casing 500A into the casing 500A through the intake port 61. The charger air-intake fan 408 draws air from outside the casing 500A into the casing 500A through the intake port 62 and blows the drawn air from above the charger 202K toward the photosensitive drum 201K.

This embodiment includes the duct unit 700 in the casing 500A to merge the airflow generated by the charger air-intake fan 408, the airflows generated by the developing-device air-intake fans 409Y to 409C, and the airflow generated by the image-formation exhaust fan 410 into one and discharge it. However, in merging the multiple airflows, if the confluences of the multiple airflows overlap to increase the pressure loss, the overall exhaust efficiency may be decreased. For this reason, this embodiment uses the duct unit 700 capable of preventing the decrease in exhaust efficiency while merging multiple airflows.

Figure 6:
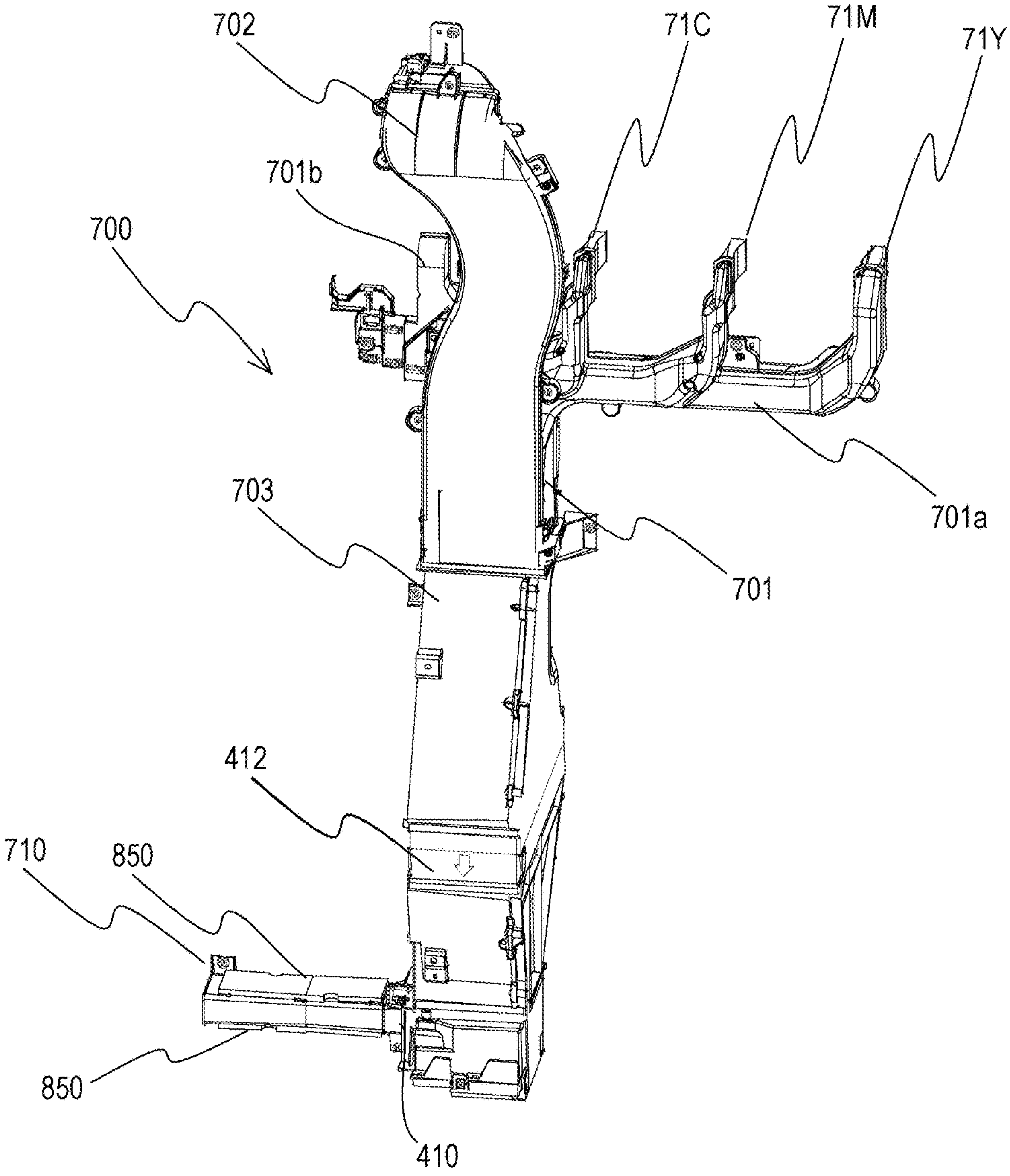
FIG. 6 is a perspective view of a duct unit illustrating the back thereof.
Figure 7:
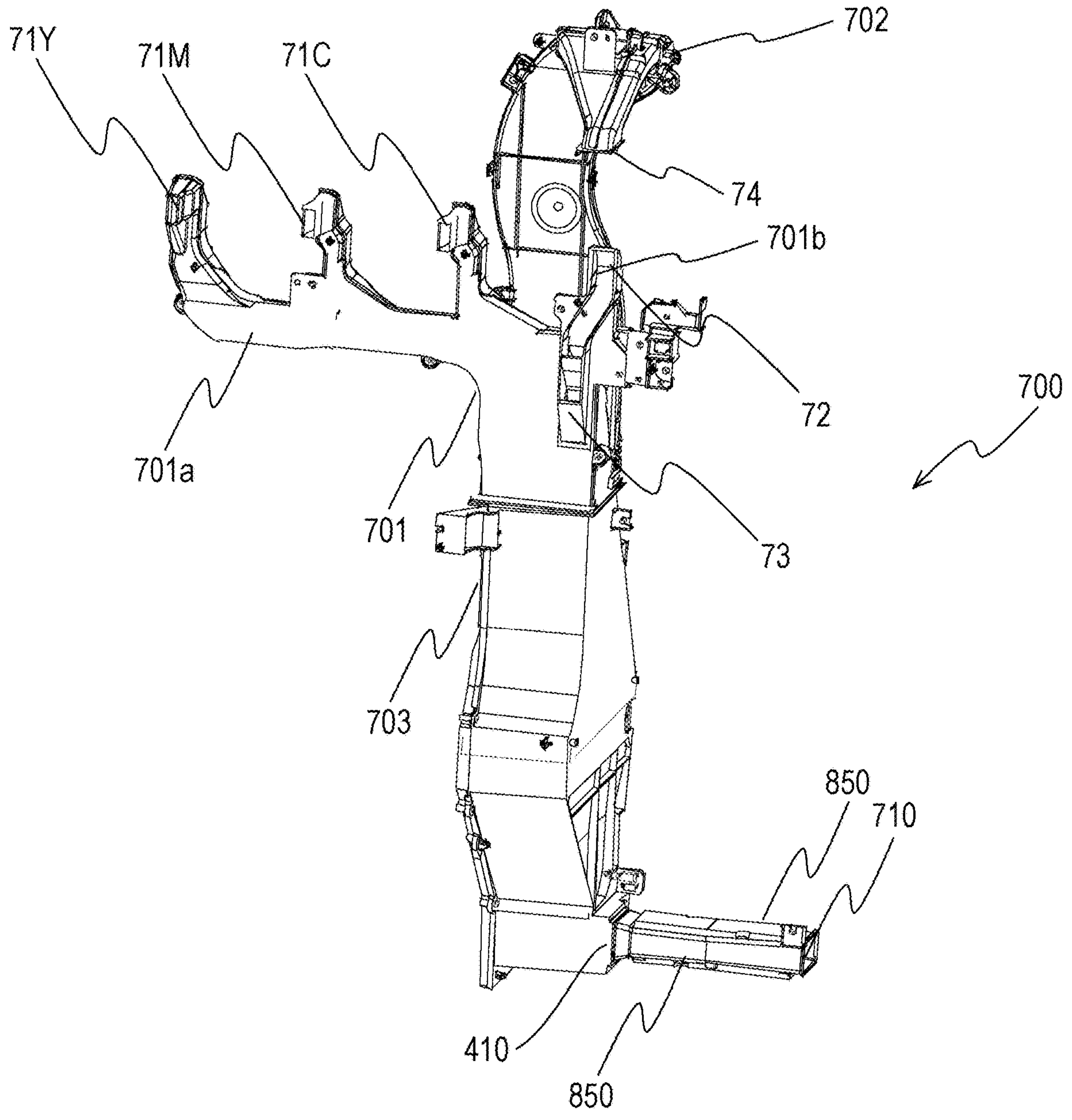
FIG. 7 is a perspective view of the duct unit illustrating the front thereof.

As illustrated in FIGS. 6 and 7, the duct unit 700 includes a developing exhaust duct 701, an ozone exhaust duct 702, an image-formation exhaust duct 703, and a fan connecting duct 710. In this embodiment, the fan connecting duct 710 is connected downstream in the airflow direction of the image-formation exhaust fan 410, and a first sound absorbing member 850, described later, is disposed outside the fan connecting duct 710.

The developing exhaust duct 701 includes a developing exhaust portion 701*a* and a cooling exhaust portion 701*b* integrally formed of resin. The developing exhaust portion 701*a* includes developing exhaust ports 71Y, 71M, and 71C. The developing exhaust ports 71Y to 71C are provided at the positions corresponding to the developing devices 204Y to 204C, respectively, so as to bring air passing through the vicinity of the developing devices 204Y, 204M, and 204C into the developing exhaust portion 701*a* as the developing-device air-intake fans 409Y, 409M, and 409C draw air. In other words, the air in the vicinity of the developing devices 204Y to 204C flows into the developing exhaust portion 701*a* through the developing exhaust ports 71Y to 71C and is merged in the developing exhaust portion 701*a*. The vicinity of the developing devices 204Y to 204C are the areas around the developing devices 204Y to 204C through which the air drawn by the developing-device air-intake fans 409Y to 409C flows.

The cooling exhaust portion 701*b* includes a pre-transfer charge exhaust port 72 and an image-formation cooling port 73. The pre-transfer charge exhaust port 72 is provided to draw air containing the ozone generated by the pre-transfer charger 219 into the cooling exhaust portion 701*b* from the vicinity of the pre-transfer charger 219. The image-formation cooling port 73 is provided to draw the air in the vicinity of the toner collection path 210 into the cooling exhaust portion 701*b*. In this embodiment, air flows into the cooling exhaust portion 701*b* through the pre-transfer charge exhaust port 72 and the image-formation cooling port 73 by the operation of the image-formation exhaust fan 410. The vicinity of the pre-transfer charger 219 is an area around the pre-transfer charger 219 from which air is exhausted by the operation of the image-formation exhaust fan 410. The vicinity of the toner collection path 210 is an area around the toner collection path 210 from which air is exhausted by the operation of the image-formation exhaust fan 410. The formation of airflow in the cooling exhaust portion 701*b* allows for collecting the ozone generated by the pre-transfer charger 219 using the image-formation discharge filter 412 and discharging the heat stagnating in the toner collection path 210.

Thus, the developing exhaust duct 701 merges the air drawn through the developing exhaust ports 71Y to 71C, the pre-transfer charge exhaust port 72, and the image-formation cooling port 73 and then allows the merged air to pass through the image-formation discharge filter 412 by using by the single image-formation exhaust fan 410. This configuration reduces the number of fans, saving the space of the casing 500A.

The ozone exhaust duct 702 is for drawing air containing the ozone generated by the charger 202K from the vicinity of the charger 202K. The image-formation exhaust duct 703 is for merging the airflow through the developing exhaust duct 701 and the airflow through the ozone exhaust duct 702 into one airflow.

This embodiment uses a Sirocco fan with high static pressure as the image-formation exhaust fan 410 to efficiently draw air from the narrow spaces through the developing exhaust ports 71Y to 71C, the pre-transfer charge exhaust port 72, and the image-formation cooling port 73 with relatively small opening areas. Sirocco fans are multi-blade fans with many rectangular fins arranged in a circular pattern and are capable of generating a high-volume airflow because they are capable of producing high static pressure even with a small size. The image-formation exhaust fan 410 is disposed in the duct unit 700.

However, Sirocco fans are particularly prone to generate loud fan noise, which is harsh noise for the user. Examples of the cause of the fan noise include aerodynamic noise generated by the rotation of the fins, airflow noise generated by the turbulence of the flowing air, and mechanically generated machine noise such as the backlash of bearings. To reduce the fan noise, the airflow noise may be reduced. One example of airflow noise reduction is based on Helmholtz's theorem using a side-branch silencer. The airflow noise reduction using the side-branch silencer will be described with reference to FIG. 28.

Figure 28:
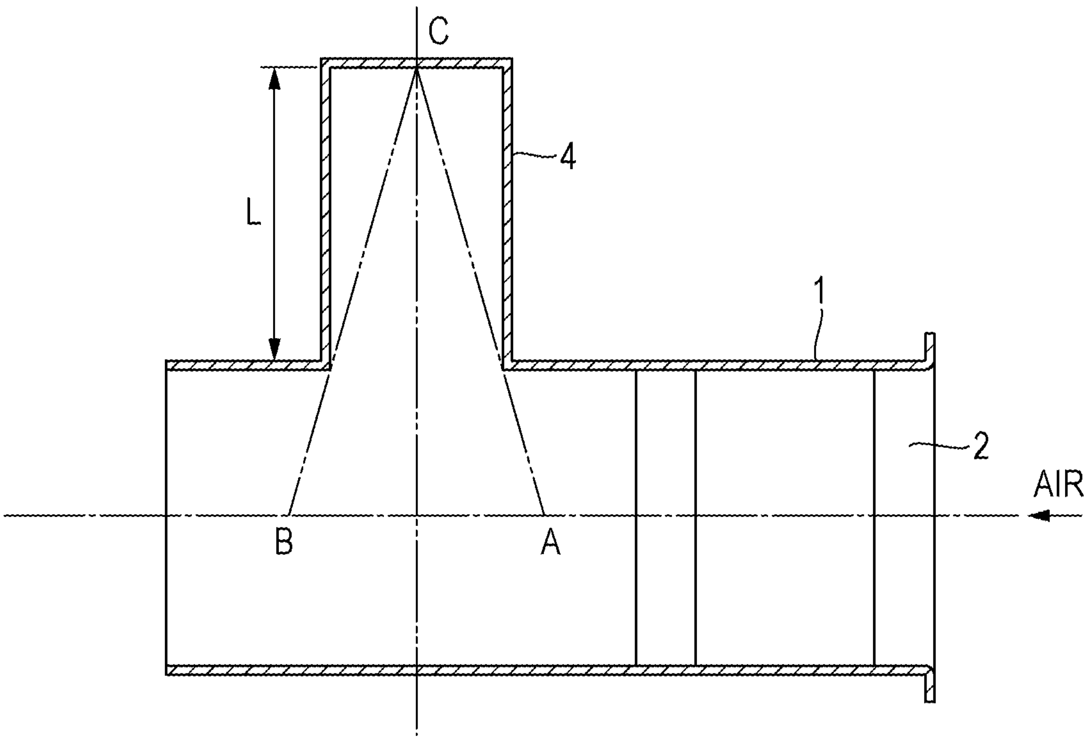
FIG. 28 is a schematic diagram of a conventional duct with a side branch.

As illustrated in FIG. 28, the side-branch silencer has a fan 2 fixed to an end of a duct 1 attached to a casing (not shown). A side branch 4 protruding from the side surface of the duct 1 in the direction perpendicular to the airflow direction, which is the direction of airflow generated in the duct 1, is provided downstream in the airflow direction. In this case, the airflow noise generated by the fan 2 is divided into a first path from point A to point B and a second path from point A to point B via point C. The length L of the side branch 4 is set so that the sound waves passing through the first path (point A-point B) and the sound waves passing through the second path (point A-point C-point B) are 180° out of phase. For this reason, the sound passing through the first path and the sound passing through the second path interfere with each other at point B, decreasing the airflow noise.

However, further miniaturization of the image forming apparatus 101 is required, and the space for fans and ducts is limited. Specifically, since the velocity of sound in air is about 331,000 mm/s, if the frequency of airflow noise is 1,000 Hz, the distance $\lambda$ that airflow noise travels in one cycle is expressed as 331,000/1,000=331 mm. In this case, airflow noise reduction requires to install the duct 1 with the side branch 4 having a length L of 82.75 mm ($2L=\lambda/2$, $L=\lambda/4$). However, some image forming apparatuses 101 do not have a sufficient space for installing a desired number and size of side branches 4.

For this reason, to reduce the airflow noise generated by the operation of the fan, this embodiment is configured to install, in place of or in addition to the side branch, the first sound absorbing member 850 outside the fan connecting duct 710 that forms an air channel for the airflow. The fan connecting duct 710 and the first sound absorbing member 850 will be described with reference to FIG. 8 to FIGS. 10A to 10D.

Fan Connecting Duct

Figure 8:
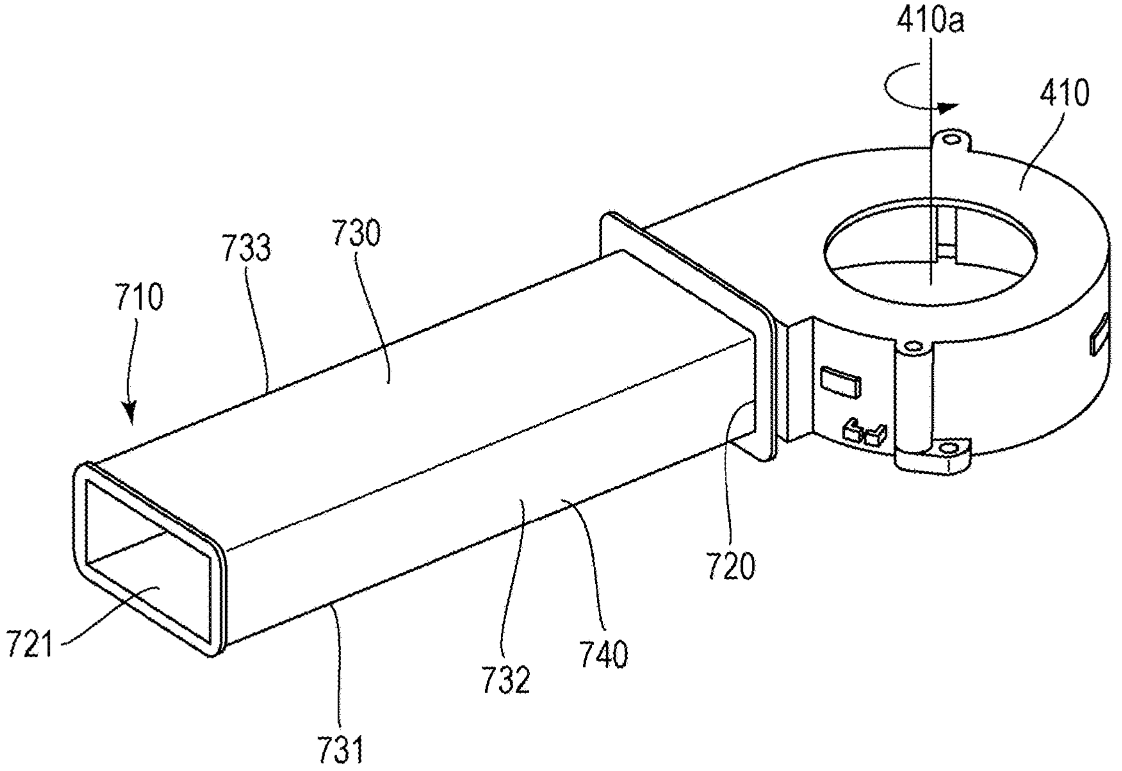
FIG. 8 is a perspective view of a fan and a fan connecting duct.

The opening of the image-formation exhaust fan 410 is rectangular in cross-section. In accordance with the shape, the fan connecting duct 710 includes a main body 740 that is rectangular in cross-section, as illustrated in FIG. 8. In this case, the main body 740 is formed in a rectangular shape in which the short sides of two imperforate walls 730 and 731, which are perpendicular to the axis of rotation 410*a* of the image-formation exhaust fan 410, are longer than the short sides of the other two imperforate walls 732 and 733. The main body 740 may not necessarily be rectangular in cross-section and may have any multiple (three or more) surfaces that are polygonal in cross-section.

The main body 740 includes a duct inlet 720 in which air flows in by the operation of the image-formation exhaust fan 410 and a duct outlet 721 from which the air flowing in through the duct inlet 720 flows out. The fan connecting duct 710 is connected to the opening of the image-formation exhaust fan 410 via the duct inlet 720, and the main body 740 forms an air channel through which the air flows in from the duct inlet 720 flows to the duct outlet 721. The fan connecting duct 710 is made of metal or resin.

First Sound Absorbing Member

Figure 9:
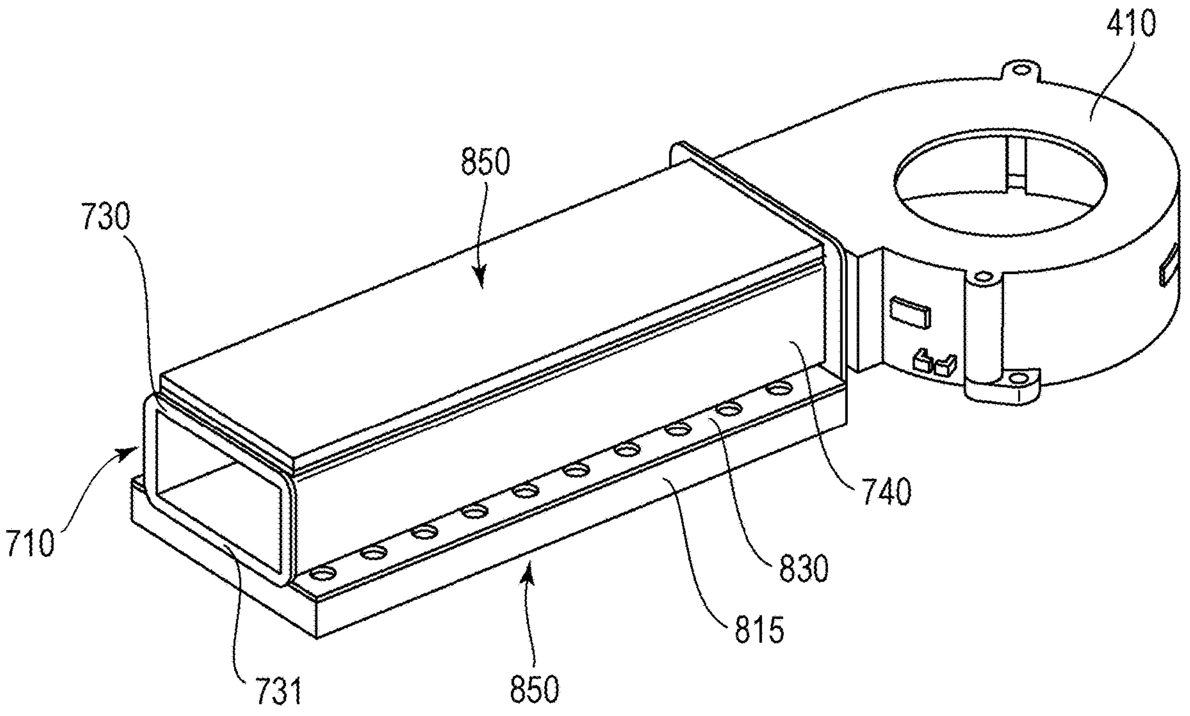
FIG. 9 is a perspective view of a fan connecting duct on which a first sound absorbing member according to a first embodiment is disposed.

FIG. 9 is a perspective view of the fan connecting duct 710 incorporating the first sound absorbing member 850 of the first embodiment. As illustrated in FIG. 9, the fan connecting duct 710 has the first sound absorbing member 850 on each of the imperforate walls 730 and 731 along at least part of the air channel of the main body 740. The first sound absorbing members 850 are bonded to the imperforate walls 730 and 731 with a bonding member such as a double-sided adhesive tape (not shown).

Figure 10A:
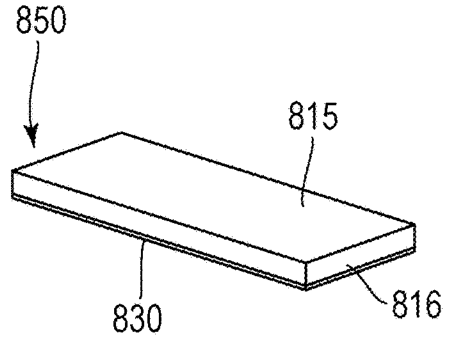
FIG. 10A is a perspective view of the first sound absorbing member.

As illustrated in FIG. 10A, the first sound absorbing member 850 includes at least a perforated plate 830 and a sound absorbing sheet 815. The sound absorbing sheet 815 has sound absorbing properties different from those of the perforated plate 830. In this embodiment, the sound absorbing sheet 815 is made of a material different from the material of the perforated plate 830. The perforated plate 830 and the sound absorbing sheet 815 are laminated in the direction perpendicular to the imperforate walls 730 and 731 of the main body 740. In other words, the first sound absorbing member 850 of this embodiment includes two-layered components constituted by the sound absorbing sheet 815 and the perforated plate 830.

Perforated Plate

Figure 10B:
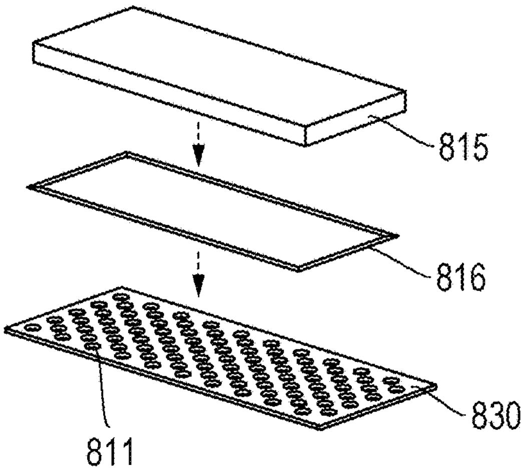
FIG. 10B is an exploded perspective view of the first sound absorbing member.

As illustrated in FIG. 9, the first sound absorbing member 850 is disposed in such a manner that the perforated plate 830 (a first layer) is closer to the main body 740. The perforated plate 830 is resin or metal plate. As illustrated in FIG. 10B, the perforated plate 830 includes multiple sound absorbing holes (through-holes) 811 to provide sound absorbing properties. In other words, when airflow noise generated by the operation of the image-formation exhaust fan 410 passes through the fan connecting duct 710, part of the airflow noise enters the sound absorbing holes 811 through the imperforate walls 730 and 731 and vibrates to convert part of the sound energy to thermal energy, thereby providing the effect of reducing the airflow noise.

Sound Absorbing Sheet

As illustrated in FIG. 10A, the sound absorbing sheet 815 is disposed on the surface of the perforated plate 830 opposite to the surface facing the main body 740 so as to cover the multiple sound absorbing holes 811. The sound absorbing sheet 815 is made of a sheet-like porous member, such as ethylene-propylene-diene monomer rubber based (EPDM-based) or urethane-based foam, a glass wool material made of glass fibers, or a mineral rock wool material. By covering the sound absorbing holes 811 of the perforated plate 830 with the porous sound absorbing sheet 815, when part of the airflow noise that has entered the sound absorbing holes 811 diffuses in the sound absorbing sheet 815, part of the sound energy is converted to thermal energy, thereby reducing the noise. The perforated plate 830 and the sound absorbing sheet 815 have different sound absorbing properties. More strictly, the perforated plate 830 and the sound absorbing sheet 815, if they have the same thickness and are disposed singly, have different sound absorbing properties. An example of the different sound absorbing properties is the degree of sound absorption per frequency. For example, the perforated plate 830 may reduce lower-frequency sound (lower pitched sound) in the audible range more effectively than the sound absorbing sheet 815. The sound absorbing sheet 815 may reduce hither-frequency sound (higher pitched sound) in the audible range more effectively than the perforated plate 830. Alternatively, the difference of the sound absorbing properties between the perforated plate 830 and the sound absorbing sheet 815 may be caused by the presence or absence of sound absorbability. In other words, when one of the perforated plate 830 and the sound absorbing sheet 815 has no sound absorbability while the other of the perforated plate 830 and the sound absorbing sheet 815 has some sound absorbability, the perforated plate 830 and the sound absorbing sheet 815 have different sound absorbing properties.

In general, the thicker the sound absorbing sheet 815, the more noise reduction for higher-frequency sound is achieved. This embodiment uses the sound absorbing sheet 815 made of EPDM-based foam with a thickness of 5 mm to obtain higher effect with low cost. If the sound absorbing sheet 815 is made of an EPDM- or urethane-based material, no sufficient noise-reduction effect is obtained if the sound absorbing sheet 815 is crushed. For this reason, the duct unit 700 is disposed in the casing 500A to prevent the sound absorbing sheet 815 of the first sound absorbing member 850 disposed on the fan connecting duct 710 from being crushed.

Figure 10C:
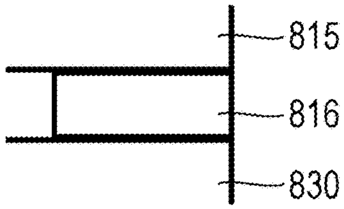
FIG. 10C is an enlarged cross-sectional view of an end of the first sound absorbing member.
Figure 10D:
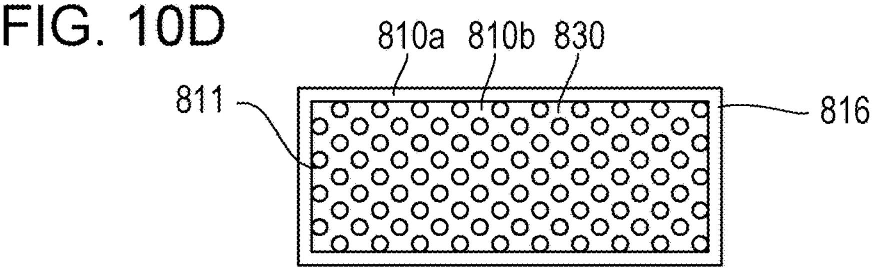
FIG. 10D is a top view of a perforated plate and a double-sided tape.

As illustrated in FIGS. 10B and 10C, the perforated plate 830 and the sound absorbing sheet 815 are laminated with a double-sided tape 816 therebetween. The sound absorbing sheet 815 is bonded to the perforated plate 830 using the adhesive double-sided tape 816 as a bonding member. However, if the double-sided tape 816 blocks the sound absorbing holes 811, the noise reduction effect can be less than when the sound absorbing holes 811 are not blocked. For this reason, as illustrated in FIG. 10D, the double-sided tape 816 may bond the perforated plate 830 and the sound absorbing sheet 815 in a no-hole area 810*a* without the sound absorbing holes 811, in other words, outside an area 810*b* with the sound absorbing holes 811. In this case, for example, a ring-shaped double-sided tape 816 is used because the no-hole area 810*a* is provided around the outer periphery of the perforated plate 830.

To enhance the bonding force using the double-sided tape 816, the sound absorbing sheet 815 is bonded at, in addition to the no-hole area 810*a*, multiple portions other than the no-hole area 810*a* (other than the outer periphery). In this case, some of the sound absorbing holes 811 may be blocked by the double-sided tape 816.

The area of the sound absorbing holes 811 may be 35% or more of the surface area of the perforated plate 830. However, the area of the multiple sound absorbing holes 811 may be 10% or more and 40% or less of the surface area of the perforated plate 830 in consideration of the machinability of the sound absorbing holes 811 in the perforated plate 830 and the bonding performance of the double-sided tape 816. The sound absorbing holes 811 may be circular holes with a diameter of 3 mm or more and 12 mm or less. Although not all of the diameters of the sound absorbing holes 811 need to be the same, all of the diameters of the sound absorbing holes 811 of this embodiment are set at 6.4 mm. The sound absorbing holes 811 may be uniformly dispersed across the main body 740.

Noise Reduction Effect

Figure 11:
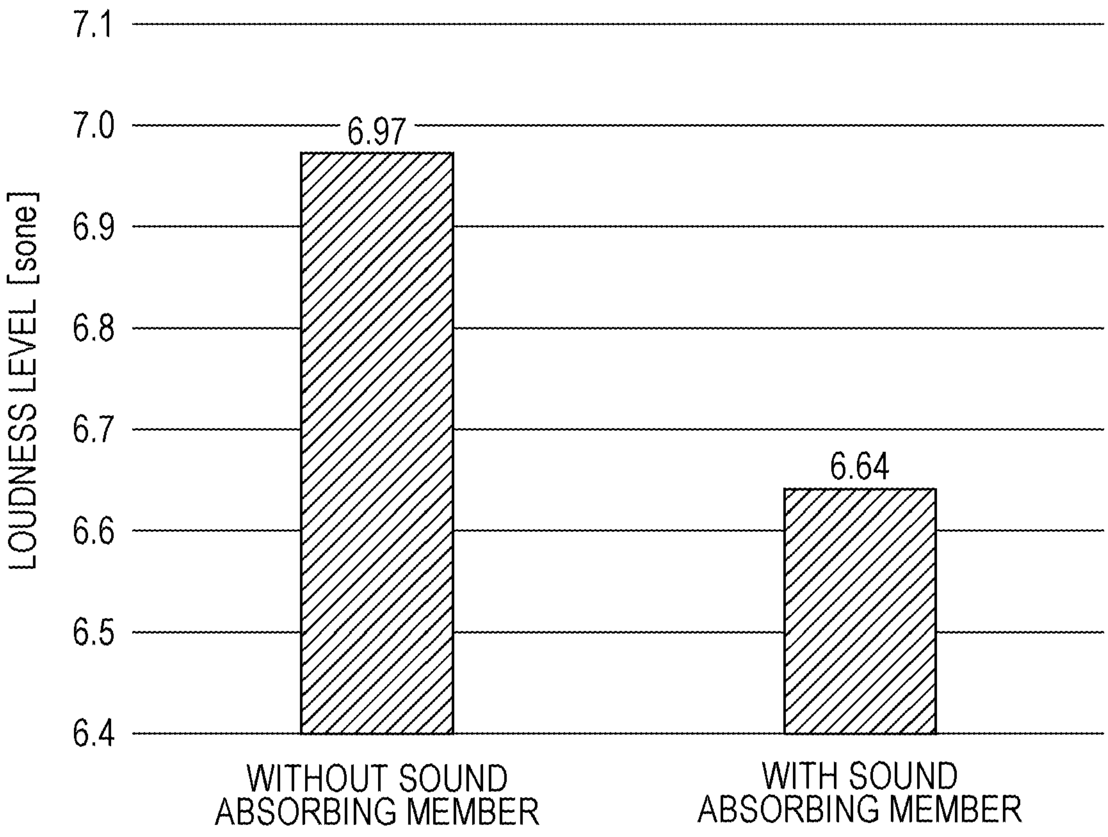
FIG. 11 is a graph showing the loudness level of airflow noise in the case where no sound absorbing member is disposed and the case where the first sound absorbing member according to the first embodiment is disposed.

FIG. 11 shows the result of comparison of the loudness level of airflow noise between the case where the first sound absorbing member 850 is disposed on the fan connecting duct 710 and the case where the first sound absorbing member 850 is not disposed, with the image-formation exhaust fan 410 operated singly. As can be understood from FIG. 11, the loudness level of the airflow noise in the case without the first sound absorbing member 850 was 6.97 sone, while the loudness level of the airflow noise in the case with the first sound absorbing member 850 was 6.64 sone. In other words, the use of the fan connecting duct 710 including the first sound absorbing member 850 of this embodiment provided the effect of reducing the noise by 0.33 sone. The use of the first sound absorbing member 850 with a thickness ranging from a few millimeters to tens millimeters provides high noise reduction effect, thereby allowing miniaturization of the apparatus.

The noise reduction configuration using the side branch disclosed in FIG. 28 is a configuration for reducing noise by making vibrations at a specific frequency interfere with each other. For this reason, this configuration has a high reduction effect for a specific frequency. However, the noise reduction configuration using a side branch may generate resonance in some frequency band. In contrast, the first sound absorbing member 850 according to this embodiment may reduce the sound in a wide frequency band in the audible range using the two-layer structure of the perforated plate 830 and the sound absorbing sheet 815 having different sound absorbing properties, which is less likely to experience resonance phenomena. Furthermore, this configuration eliminates the need for changing the shape according a specific frequency. For this reason, even if the fan is replaced with a higher-speed fan, or if a single fan is used while changing the rotational speed, a single sound absorbing member 850 is sufficient.

Thus, this embodiment disposes two-layered sound absorbing member 850 including the perforated plate 830 having multiple sound absorbing holes 811 and the sound absorbing sheet 815 blocking the multiple sound absorbing holes 811 outside the fan connecting duct 710 to provide an airflow noise reduction effect. In other words, when part of the airflow noise generated by the operation of the image-formation exhaust fan 410 passes through the sound absorbing holes 811 in the first-layer perforated plate 830, part of the sound energy is converted to thermal energy, thereby reducing the airflow noise. Furthermore, since part of the sound energy of the sound that has passed through the sound absorbing holes 811 is converted to thermal energy by the second-layer sound absorbing sheet 815, the airflow noise is further reduced.

Thus, this embodiment reduces the airflow noise generated by the operation of the fan using the small-space configuration.

In the case where the sound absorbing sheet 815 having sound absorbing properties is used singly, most of which generally exhibit sound absorbing effects for a specific frequency, the sound absorbing sheet 815 exhibits a characteristic peak in the middle when the frequency is plotted on the horizontal axis and the degree of sound absorption on the vertical axis. The degree of sound absorption of low-frequency sound ((lower pitched sound) in the audible range can be improved by increasing the thickness of the sound absorbing sheet 815. However, for the sound in a main frequency band in the audible range, the effect of improving the degree of sound absorption was difficult to obtain even if the thickness of the sound absorbing sheet 815 was increased. In contrast, this embodiment reduces wide-frequency sound including the main frequency sound in the audible range by using the two-layered sound absorbing member 850 including the perforated plate 830 and the sound absorbing sheet 815.

If the image-formation exhaust fan 410 is a Sirocco fan that generates airflow by rotating fins about the axis of rotation 410*a* (see FIG. 8), disposing the first sound absorbing members 850 outside the two imperforate walls 730 and 731 perpendicular to the axis of rotation 410*a* of the fan provides a high noise reduction effect. Disposing the first sound absorbing members 850 only on the other imperforate walls 732 and 733 also provides a noise reduction effect. However, this configuration provides a relatively small noise reduction effect than the case where the first sound absorbing members 850 are disposed only on the imperforate walls 730 and 731. To obtain a higher noise reduction effect higher than the configuration in which the first sound absorbing members 850 are disposed only on the imperforate walls 730 and 731, the first sound absorbing members 850 may be disposed on all of the four imperforate walls 730, 731, 732, and 733 to increase the noise reduction effect. To provide the noise reduction effect of this embodiment, if the main body 740 is polygonal in cross-section, the first sound absorbing member 850 may be disposed on at least one of the multiple surfaces. Even if the main body 740 is circular, the noise reduction effect is obtained by disposing the first sound absorbing member 850 on at least part of the outer wall.

Attaching/Detaching Mechanism

The above embodiment illustrates an example in which the first sound absorbing members 850 are bonded to the fan connecting duct 710 (specifically, the imperforate walls 730 and 731) with a double-sided tape (not shown). However, this is illustrative only. The first sound absorbing members 850 may be detachably mounted on the fan connecting duct 710. A mechanism for detachably attaching the first sound absorbing member 850 to the fan connecting duct 710 will be described with reference to FIGS. 12A and 12B and FIGS. 13A to 13D. The following describes an example in which the first sound absorbing member 850 is detachably mounted on the imperforate wall 730 of the fan connecting duct 710.

Figure 12A:
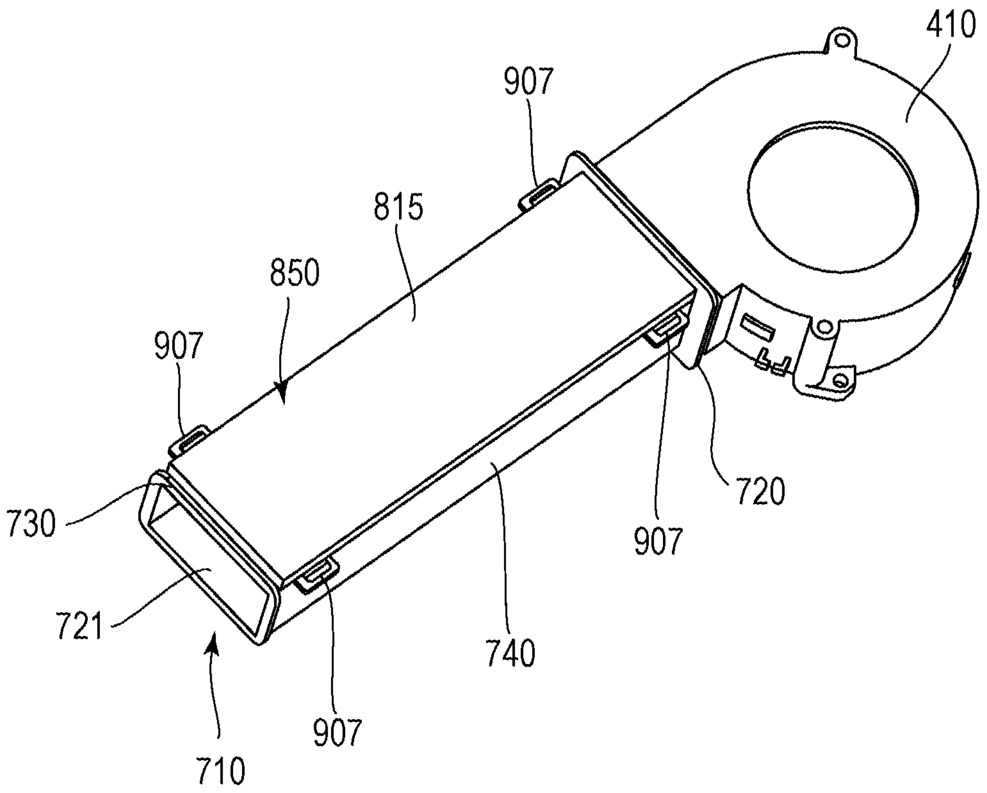
FIG. 12A is a perspective view of an attaching/detaching mechanism.
Figure 12B:
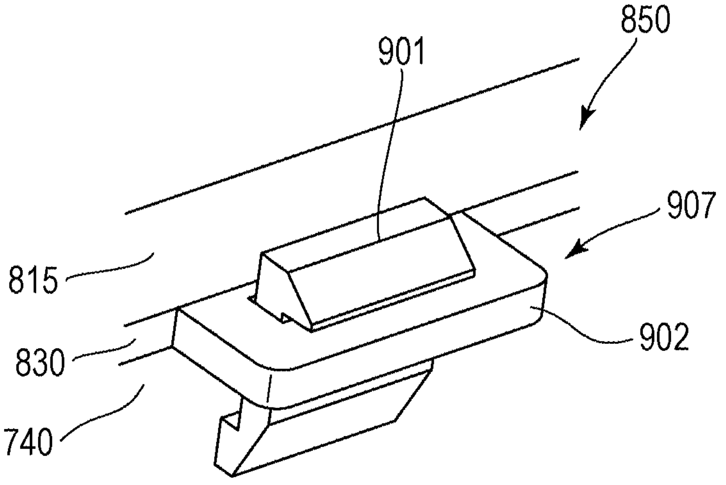
FIG. 12B is an enlarged view of the attaching/detaching mechanism.

As illustrated in FIG. 12A, the first sound absorbing member 850 is detachably mounted on the fan connecting duct 710 with snap fittings 907. The snap fittings 907 are provided at two positions close to the duct inlet 720 and at two positions close to the duct outlet 721 in the longitudinal direction of the fan connecting duct 710. As illustrated in FIG. 12B, each snap fitting 907 serving as an attaching/detaching mechanism includes a locking claw 901 (a first retaining portion) and a claw retainer 902 (a second retaining portion). When the first sound absorbing member 850 is mounted on the main body 740, the locking claw 901 locks the claw retainer 902, and when the first sound absorbing member 850 is detached from the main body 740, the locking claw 901 and the claw retainer 902 are unlocked.

Figure 13A:
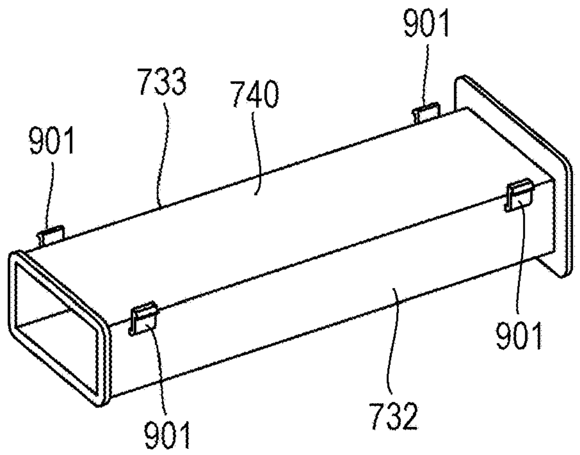
FIG. 13A is a perspective view of locking claws.
Figure 13B:
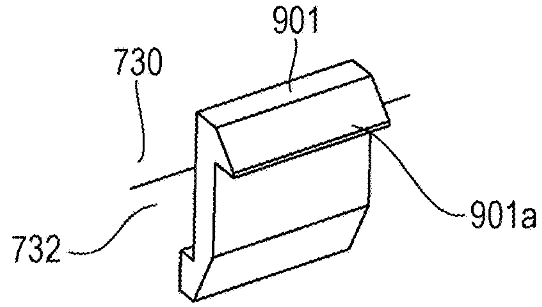
FIG. 13B is an enlarged view of the locking claw.
Figure 13C:
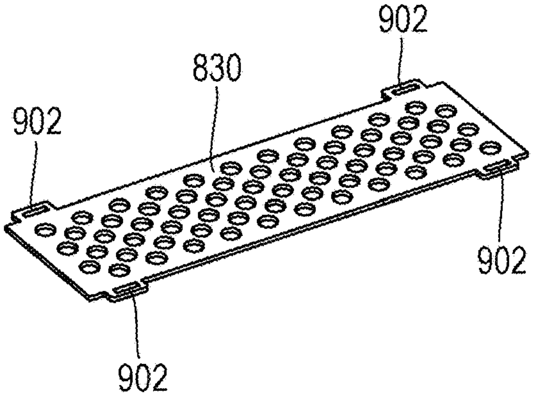
FIG. 13C is a perspective view of claw retainers.
Figure 13D:
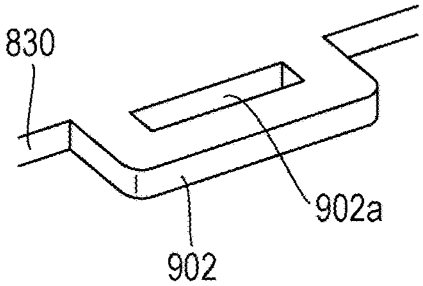
FIG. 13D is an enlarged view of the claw retainer.

As illustrated in FIG. 13A, the locking claws 901 are provided on the imperforate walls 732 and 733 of the main body 740. As illustrated in FIG. 13B, the locking claw 901 has an elastically deformable hook 901*a*. The hook 901*a* protrudes from the imperforate wall 730. As illustrated in FIG. 13C, the claw retainer 902 is provided at the perforated plate 830. As illustrated in FIG. 13D, the claw retainer 902 has a grappling hole 902*a* through which the hook 901*a* of the locking claw 901 can be passed. When the first sound absorbing member 850 is mounted on the main body 740, the hook 901*a* is inserted in the grappling hole 902*a* while being elastically deformed and then hooked in the grappling hole 902*a*, thereby being retained in the grappling hole 902*a* (locked state). Thus, the first sound absorbing member 850 is mounted on the fan connecting duct 710, as illustrated in FIG. 12A.

Perforated Fan Connecting Duct

Figure 14:
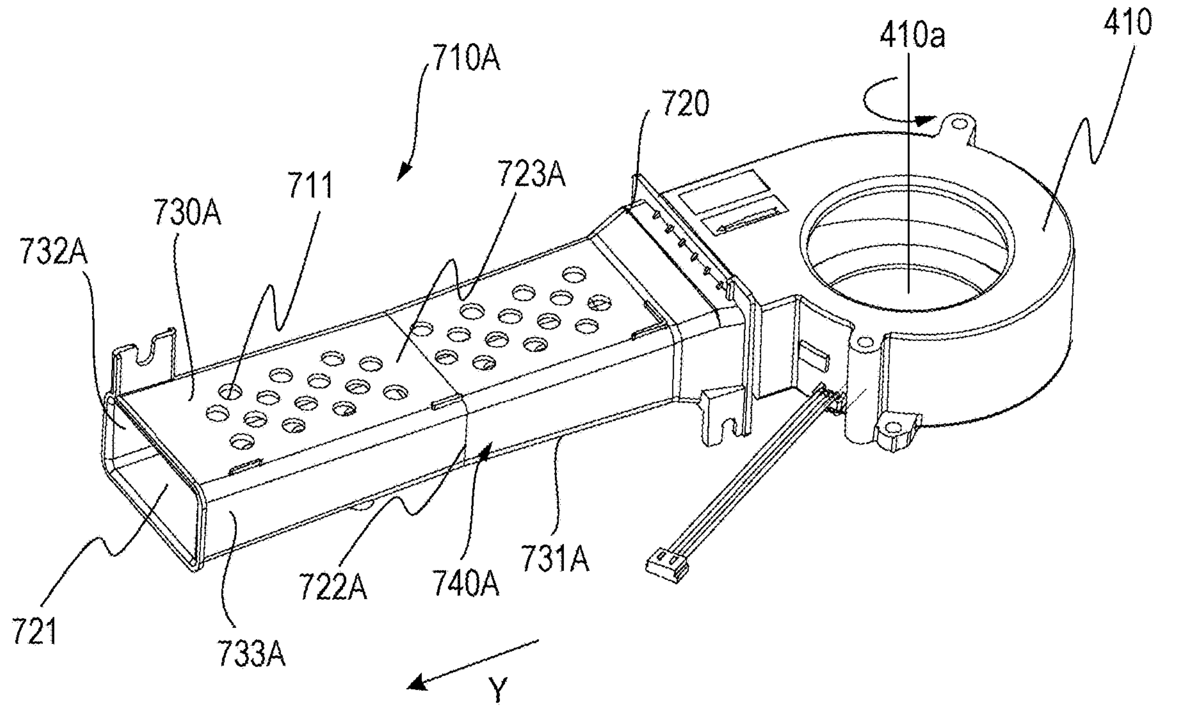
FIG. 14 is a perspective view of a perforated fan connecting duct.
Figure 15:
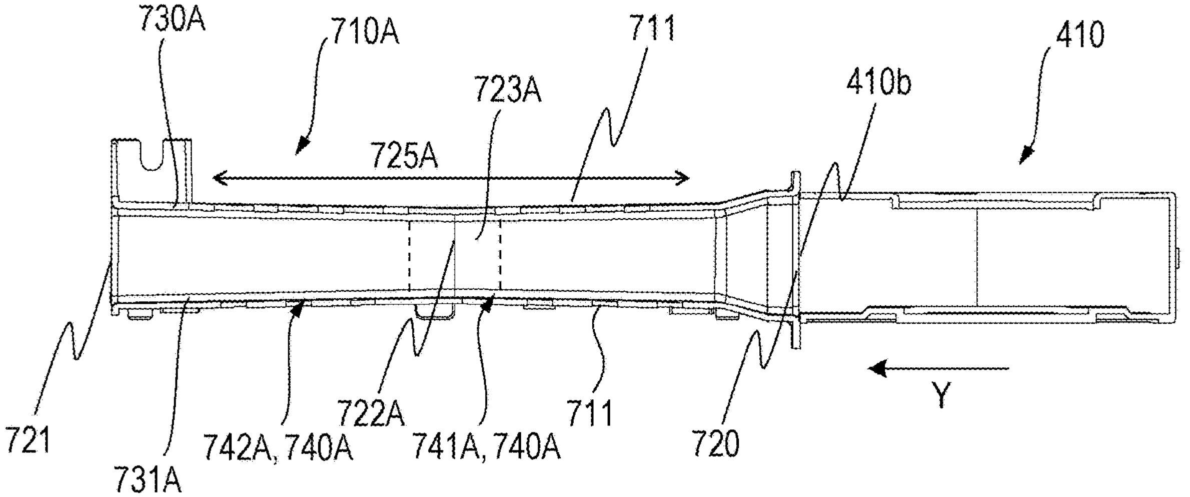
FIG. 15 is a cross-sectional view of the perforated fan connecting duct.

Although the above embodiment illustrates an example in which the first sound absorbing member 850 is disposed on the imperforate fan connecting duct 710 including the imperforate walls 730 to 733 having no holes in the wall surfaces, this is illustrative only. The first sound absorbing member 850 may be mounted on a perforated fan connecting duct 710A having multiple through-holes in a wall surface. FIGS. 14 and 15 illustrates the perforated fan connecting duct 710A. The configuration of the first sound absorbing member 850 is the same as in FIG. 9 and FIGS. 10A to 10D except the differences.

As illustrated in FIG. 14, the perforated fan connecting duct 710A includes a perforated wall 730A having multiple sound absorbing holes (through-holes) 711 and a perforated wall 731A opposed to the perforated wall 730A and having multiple sound absorbing holes (through-holes) 711. The fan connecting duct 710A has four surfaces 730A, 731A, 732A, and 733A. The sound absorbing holes 711 may be formed in the wall surfaces 732A and 733A or all or only one of the four surfaces 730A to 733A.

In the fan connecting duct 710A, when the airflow noise generated by the operation of the image-formation exhaust fan 410 passes through the main body 740A, part of the airflow noise enters the sound absorbing holes 711 and vibrates, converting part of the sound energy into thermal energy, thereby reducing the airflow noise. Since the image-formation exhaust fan 410 is a Sirocco fan, forming the sound absorbing holes 711 in the two perforated walls 730A and 731A perpendicular to the axis of rotation 410*a* of the fan 410 provides a high noise reduction effect. If the sound absorbing holes 711 are formed only in the other perforated walls 732A and 733A, the noise reduction effect is lower than when the sound absorbing holes 711 are formed only in the perforated walls 730A and 731A. However, if a sufficient noise reduction effect is not given even when the sound absorbing holes 711 are formed only in the perforated walls 730A and 731A, the sound absorbing holes 711 may be formed in all of the four perforated walls 730A to 733A to enhance the noise reduction effect.

However, in the case where the fan connecting duct 710A is to be manufactured from resin by injection molding using a mold, the mold for forming the sound absorbing holes 711 in all of the four surfaces is complicated, resulting in high cost. For this reason, separate molds may be prepared to produce the separate components of the fan connecting duct 710A, and the components may be combined. However, this configuration is likely to produce a gap between the separate components, which needs additional components for blocking the gap. Furthermore, this configuration may produce a level difference between the components, which increases the airflow noise caused by the operation of the image-formation exhaust fan 410, resulting in insufficient noise reduction effect even with the sound absorbing holes 711. Accordingly, the sound absorbing holes 711 may be formed only in the perforated walls 730A and 731A perpendicular to the axis of rotation 410*a* of the fan 410.

In contrast, if the fan connecting duct 710A is to be made of metal, the sound absorbing holes 711 can easily be formed in all of the four surfaces, and the gap between the sound absorbing holes 711 can be smaller than the fan connecting duct 710A made of resin, providing an advantage in increasing the number of sound absorbing holes 711. However, manufacturing the metal fan connecting duct 710A with the portion downstream from the duct inlet 720 in an inclined shape to decrease the cross-sectional area of the air channel of the region of the sound absorbing holes 711 has the disadvantage of being more costly than using resin. The fan connecting duct 710A may be manufactured from resin rather than metal in consideration of the advantage and disadvantage.

If a level difference is present between a spouting port 410*b* of the image-formation exhaust fan 410 and the duct inlet 720 of the fan connecting duct 710A illustrated in FIG. 15, loud airflow noise may be generated. For this reason, no level difference is desirable. However, it is difficult to form the different components, the image-formation exhaust fan 410 and the fan connecting duct 710A so as to be connectable without level difference. For this reason, the duct inlet 720 is formed to be a little wider than the spouting port 410*b* of the image-formation exhaust fan 410.

The portion of the fan connecting duct 710A downstream from the duct inlet 720 in the airflow direction may be shaped so that the airflow expands in the fan connecting duct 710A so that part of the airflow noise easily enters the sound absorbing holes 711. For this purpose, the position downstream from the duct inlet 720 is inclined so that the cross-sectional area of the air channel in a sound absorbing hole area 725A having the sound absorbing holes 711 is smaller than the cross-sectional area of the spouting port 410*b*.

The main body 740A includes a first main body 741A that decreases in cross-sectional area from the upstream side to the downstream side in the airflow direction (in the direction of arrow Y) and a second main body 742A that continues downstream from the first main body 741A and increases in cross-sectional area from the upstream side to the downstream side. In the first main body 741A, the perforated walls 730A and 731A are inclined at, for example, about one degree, to come close to each other to decrease the duct cross-sectional area from the duct inlet 720 to a smallest cross-sectional area portion 722A, which is the boundary between the first main body 741A and the second main body 742A. In the second main body 742A, the perforated walls 730A and 731A are inclined at, for example, about one degree, to come away from each other to increase the duct cross-sectional area from the smallest cross-sectional area portion 722A to the duct outlet 721. In this manner, the fan connecting duct 710A is formed so that the air channel in the vicinity of a duct central portion 723A including the smallest cross-sectional area portion 722A is narrower than the air channel close to the duct inlet 720 upstream in the airflow direction. The fan connecting duct 710A is formed so that the air channel closer to the duct outlet 721 downstream in the airflow direction is wider than the air channel in the vicinity of the duct central portion 723A.

The reason for slanting the first main body 741A is to make part of the airflow noise easily enter the sound absorbing holes 711. In contrast, the reason for slanting the second main body 742A is to increase the cross-sectional area of the duct outlet 721. This is because if the duct outlet 721 is small in cross-sectional area, the airflow noise generated from the main body 740A tends to increase. This configuration is to prevent it. The perforated walls 730A and 731A do not have the sound absorbing holes 711 at the duct central portion 723A.

The sound absorbing holes 711 in the perforated wall 730A and the sound absorbing holes 711 in the perforated wall 731A may be formed not to overlap with each other as viewed from the perforated wall 730A to the perforated wall 731A. Staggering the sound absorbing holes 711 between the perforated wall 730A and the perforated wall 731A makes part of the airflow noise easily enter the sound absorbing holes 711 of both the perforated walls 730A and 731A of the fan connecting duct 710A, thereby enhancing the airflow noise reduction effect. The sound absorbing holes 711 may be circular hole with a diameter of 3 mm or more and 12 mm or less. Although not all of the diameters of the sound absorbing holes 711 need to be the same, all of the diameters of the sound absorbing holes 711 of this embodiment are set to 6.4 mm. The sound absorbing holes 711 may be uniformly dispersed across the main body 740A.

The first sound absorbing member 850 is disposed on each of the perforated walls 730A and 731A having the sound absorbing holes 711 of the perforated fan connecting duct 710A. In this case, part of the sound energy of the sound that has passed through the sound absorbing holes 711 of the fan connecting duct 710A is converted into thermal energy by the two-layered sound absorbing members 850, and therefore the airflow noise is reduced more than with the imperforate fan connecting duct 710 (see FIG. 8). The first sound absorbing member 850 may also be disposed on the imperforate walls 732A and 733A without the sound absorbing holes 711 of the fan connecting duct 710A.

Recess-Formed Fan Connecting Duct

Figure 16A:
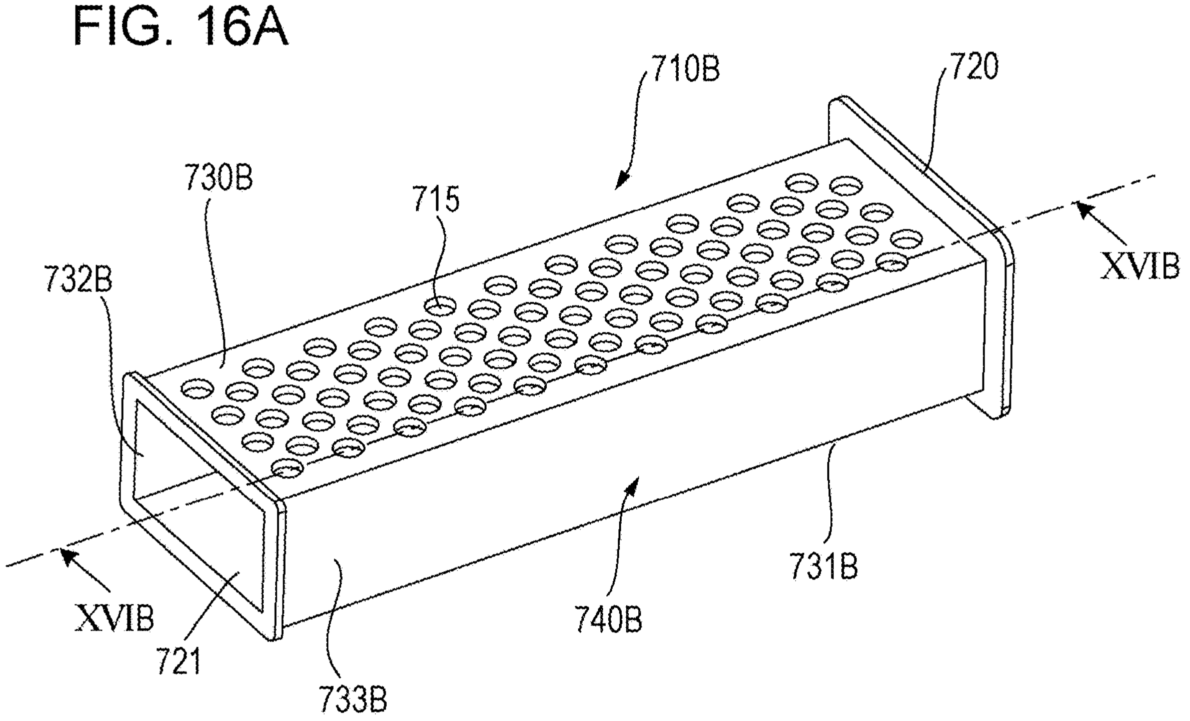
FIG. 16A is a perspective view of a recess-formed fan connecting duct.
Figure 16B:
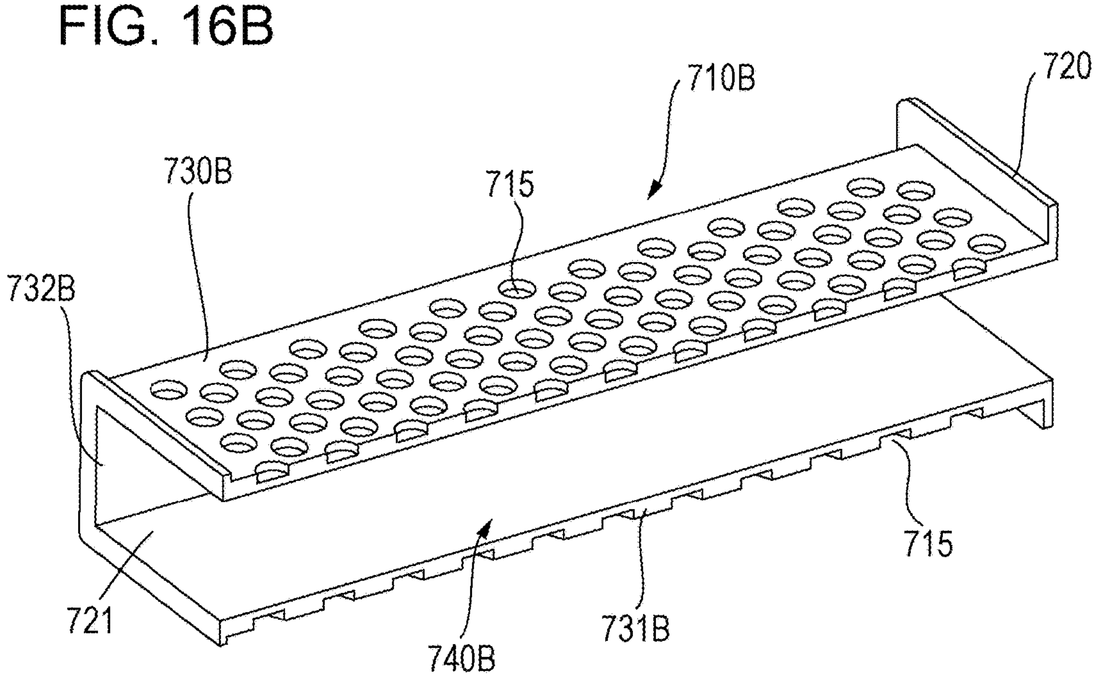
FIG. 16B is a cross-sectional view of the recess-formed fan connecting duct taken along line XVIB-XVIB.

The first sound absorbing member 850 may be disposed on a fan connecting duct 710B with multiple recesses in the wall. FIGS. 16A and 16B illustrate the recess-formed fan connecting duct 710B. The configuration of the first sound absorbing member 850 is the same as in FIG. 9 and FIGS. 10A to 10D except the differences. As illustrated in FIGS. 16A and 16B, the recess-formed fan connecting duct 710B includes a wall surface 730B having multiple blind recesses 715 and a wall surface 731B opposed to the wall surface 730B and having multiple blind recesses 715. The recesses 715 may be depressions of the outer surface of a main body 740B and may be not only circular but also polygonal or the like.

In fan connecting duct 710B, when airflow noise generated by the operation of the image-formation exhaust fan 410 passes through the main body 740B, part of the airflow noise enters the recesses 715 and vibrates to convert part of the sound energy to thermal energy, thereby providing the effect of reducing the airflow noise. The first sound absorbing member 850 is disposed on each of the wall surfaces 730B and 731B having the recesses 715 of the recess-formed fan connecting duct 710B. This configuration allows for further converting part of the sound energy of the sound that has passed through the recesses 715 of the recess-formed fan connecting duct 710B into thermal energy using the two-layered sound absorbing members 850, and therefore the airflow noise is reduced more than with the imperforate fan connecting duct 710 (see FIG. 8). The fan connecting duct 710B differs from the perforated fan connecting duct 710A in that the wall surfaces have, not the sound absorbing holes 711, but the recesses 715, and may be the same in the other configuration, and therefore descriptions will be omitted.

First Sound Absorbing Member+Sound Absorbing Sheet

Figure 17:
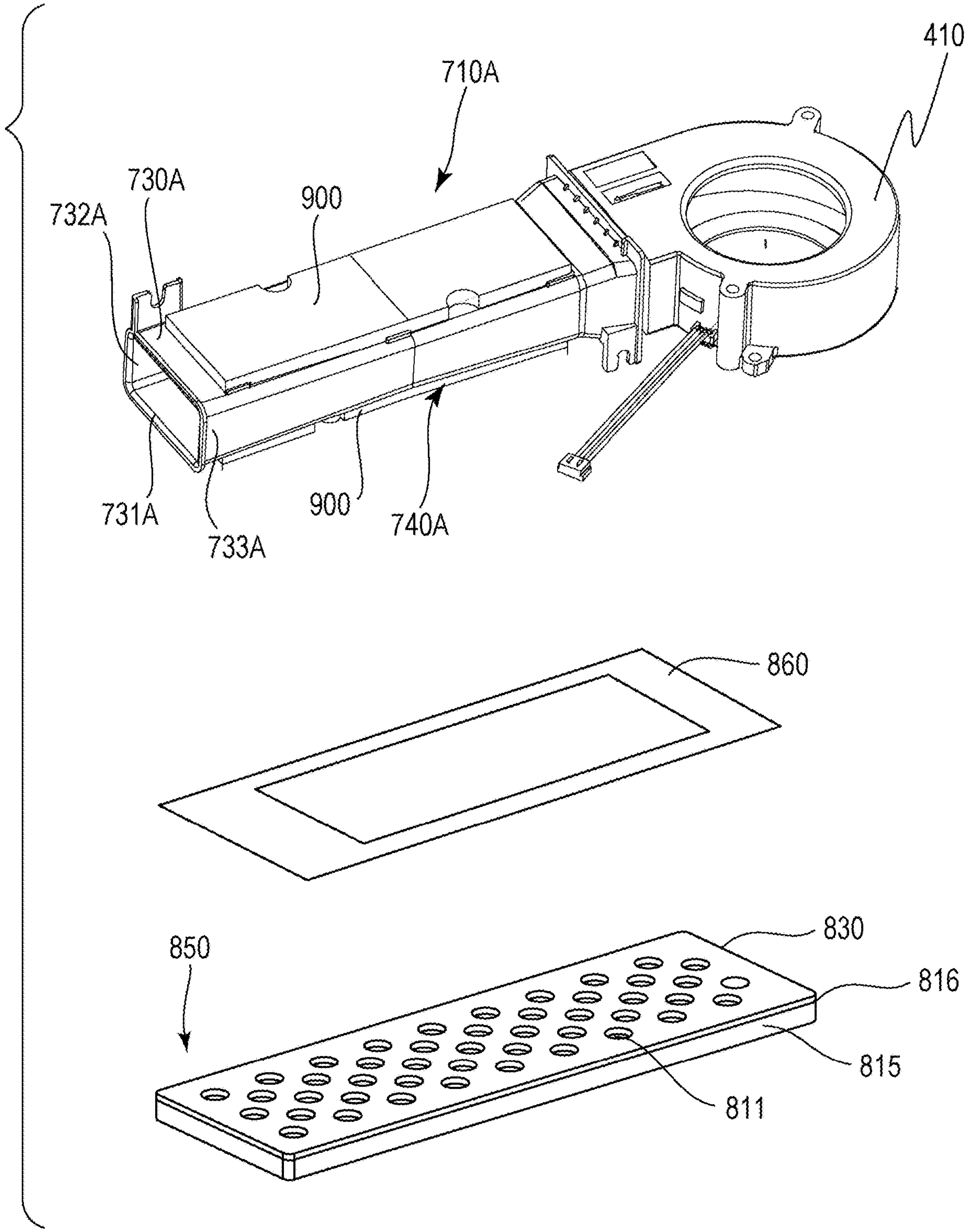
FIG. 17 is a perspective view of a fan connecting duct on which a sound absorbing sheet is disposed in addition to the first sound absorbing member.

Although the above embodiments illustrate examples in which only the first sound absorbing member 850 is disposed on the fan connecting duct 710 (710A and 710B), this is illustrative only. For example, a sound absorbing sheet may be additionally disposed between the first sound absorbing member 850 and the fan connecting duct 710 (710A and 710B). FIG. 17 illustrates a case where a sound absorbing sheet 900 is disposed in addition to the first sound absorbing member 850. FIG. 17 illustrates the perforated fan connecting duct 710A (see FIG. 14) as an example, in which the first sound absorbing member 850 is disposed on the sound absorbing sheet 900 disposed on the perforated wall 731A. For example, the sound absorbing sheet 815 and the sound absorbing sheet 900 may be made of EPDM-based foam to reduce the cost.

As illustrated in FIG. 17, the sound absorbing sheet 900 (a second sound absorbing member) is bonded to the perforated wall 731A with a double-sided tape so as cover all the multiple sound absorbing holes 711 formed in the perforated wall 731A. The two-layered sound absorbing member 850 (the first sound absorbing member) is bonded to the outside of the sound absorbing sheet 900 with a double-sided tape 860. The double-sided tape 860 bonds the perforated plate 830 so as not to block the sound absorbing holes 811. Thus, a double-sided tape (not shown), the sound absorbing sheet 900, the double-sided tape 860, the perforated plate 830, a double-sided tape 816, and a sound absorbing sheet 815 are layered on the perforated wall 731A are layered in this order from the perforated wall 731A in the direction perpendicular to the perforated wall 731A. In other words, the perforated plate 830 is disposed between the sound absorbing sheet 900 and the sound absorbing sheet 815.

In the fan connecting duct 710A, when airflow noise generated by the operation of the image-formation exhaust fan 410 passes through the main body 740A, part of the airflow noise enters the sound absorbing holes 711 and vibrates to convert part of the sound energy to thermal energy, thereby reducing the airflow noise. By covering the sound absorbing holes 711 with the sound absorbing sheet 900, when part of the airflow noise that has passed through the sound absorbing holes 711 disperses in the sound absorbing sheet 900, part of the sound energy is converted into thermal energy. The sound that has passed through the sound absorbing sheet 900 is reduced by the first sound absorbing member 850. As described above, in the first sound absorbing member 850, when part of the sound that has passed through the sound absorbing sheet 900 passes through the sound absorbing holes 811, part of the sound energy is converted into thermal energy, and part of the sound energy of the sound that has passed through the sound absorbing holes 811 is further converted into thermal energy by the sound absorbing sheet 815. In this manner, the airflow noise is progressively reduced each time it passes through the sound absorbing holes 711, the sound absorbing sheet 900, the sound absorbing holes 811, and the sound absorbing sheet 815.

Noise Reduction Effect

Figure 18:
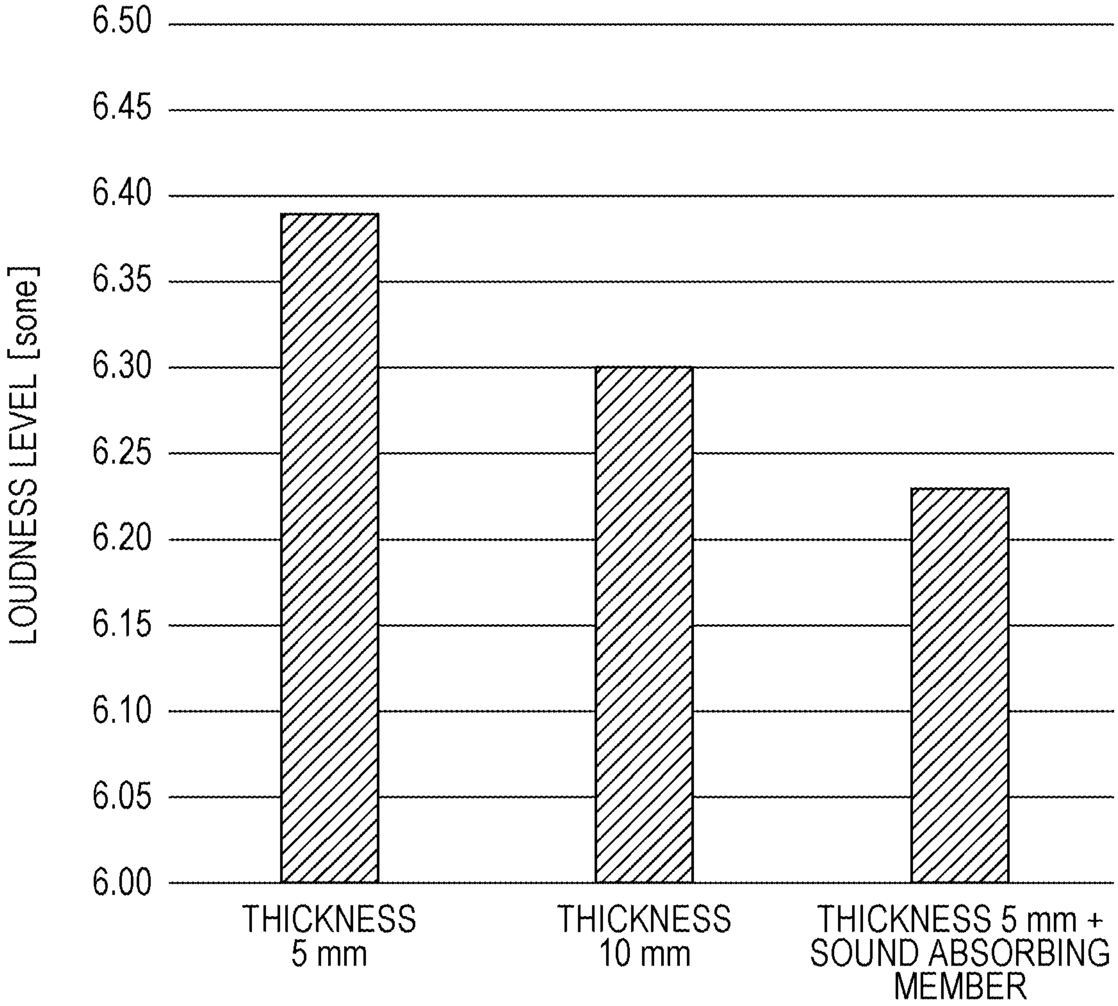
FIG. 18 is a graph showing the loudness level of airflow noise according to an embodiment in the case where the thickness of the sound absorbing sheet is varied and the case where the first sound absorbing member is added.

FIG. 18 illustrates the loudness level of airflow noise when the image-formation exhaust fan 410 is operated singly in the case where only the sound absorbing sheet 900 with a thickness of 5 mm is disposed, the case where only the sound absorbing sheet 900 with a thickness of 10 mm is disposed, and the case where the sound absorbing sheet 900 with a thickness of 5 mm and the first sound absorbing member 850 are disposed. The sound absorbing sheet 815 of the first sound absorbing member 850 was made of the same material as the material of the sound absorbing sheet 900 and has a thickness of 5 mm (EPDM-based foam).

As can be understood from FIG. 18, disposing the first sound absorbing member 850 in addition to the sound absorbing sheet 900 with a thickness of 5 mm provided a higher airflow noise reduction effect than when increasing the thickness of the sound absorbing sheet 900 from 5 mm to 10 mm. This is because the sound absorbing sheets 900 and 815 and the sound absorbing holes 811 of the perforated plate 830 differ in frequency band at which the sound energy is converted into thermal energy. In other words, disposing the first sound absorbing member 850 in addition to the sound absorbing sheet 900 adapts to a wider frequency band than using the sound absorbing sheet 900 having an increased thickness, which makes it easier to achieve nose reduction, decreasing the loudness level (6.23 sone). To obtain a higher airflow noise reduction effect, the sound absorbing sheet 900 and the sound absorbing sheet 815 may be made of different materials. This is because the frequency band of sound at which the sound energy is converted into thermal energy differs depending on the material of the sound absorbing sheet.

The first sound absorbing member 850 may be separated from the sound absorbing sheet 900 (for example, 3 mm). For example, the first sound absorbing member 850 may be separated from the sound absorbing sheet 900 by increasing the thickness of the double-sided tape 860 for bonding the sound absorbing sheet 900 and the first sound absorbing member 850. Separating the first sound absorbing member 850 from the sound absorbing sheet 900 allows for adjusting the frequency band of sound to be reduced by the sound absorbing holes 811 of the perforated plate 830. For example, increasing the gap between the first sound absorbing member 850 and the sound absorbing sheet 900 allows the sound absorbing holes 811 to reduce the sound in a lower frequency band (lower pitched sound) in the audible range as compared with a case before the gap is increased. However, a higher airflow noise reduction effect is provided when there is no gap between the first sound absorbing member 850 and the sound absorbing sheet 900.

In the configuration illustrated in FIG. 17, the sound absorbing sheet 900 may be included in the first sound absorbing member 850. In other words, the first sound absorbing member 850 may include the three layers, the sound absorbing sheet 900, the perforated plate 830, and the sound absorbing sheet 815, in this order from the main body 710. In other words, the noise reduction effect of this embodiment is provided according to the configuration of the walls of the main body 710 and combinations of the number, materials, and shapes of the layers disposed outside the walls.

Second Embodiment

Figure 19:
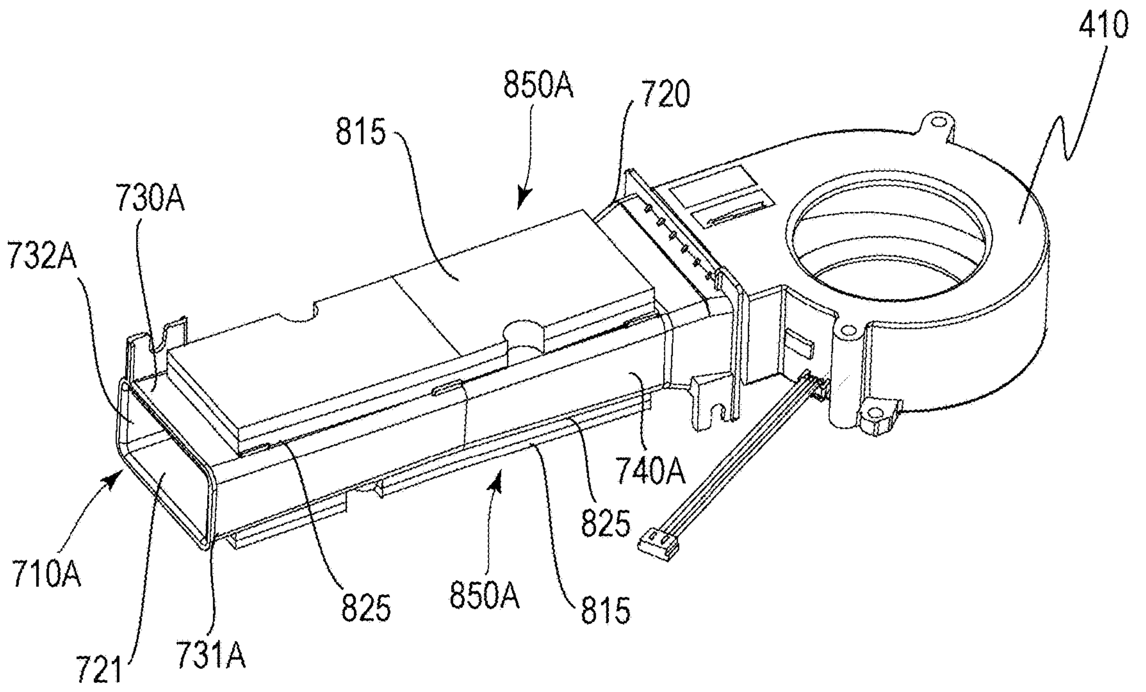
FIG. 19 is a perspective view of a fan connecting duct on which a first sound absorbing member according to a second embodiment is disposed.

Next, a second embodiment will be described with reference to FIGS. 19 and 20. FIG. 19 is a perspective view of a fan connecting duct 710A including a first sound absorbing member 850A according to a second embodiment. In other words, the first sound absorbing member 850A is disposed outside the fan connecting duct 710A, in place of the first sound absorbing member 850 according to the first embodiment. In this example, the first sound absorbing member 850A is disposed on the perforated fan connecting duct 710A (see FIG. 14). The first sound absorbing member 850A may be disposed on the imperforate fan connecting duct 710 (see FIG. 8) or the recess-formed fan connecting duct 710B (see FIG. 16A). The second embodiment will be described hereinbelow, in which the same reference signs are used for the same components as in the first embodiment, and the description is simplified or omitted.

First Sound Absorbing Member

As illustrated in FIG. 19, the first sound absorbing member 850A according to the second embodiment includes a sound absorbing sheet 815 and a sound absorbing sheet 825. The sound absorbing sheets 815 and 825 are layered in the direction perpendicular to perforated walls 730A and 731A. The first sound absorbing member 850A is disposed in such a manner that the sound absorbing sheet 825 (a first layer) covers the multiple sound absorbing holes 711 formed in the perforated walls 730A and 731A (see FIG. 14). The sound absorbing sheet 815 (a second layer) is layered and bonded on the sound absorbing sheet 825 with a double-sided tape or the like (not shown).

By covering the sound absorbing holes 711 with the sound absorbing sheet 825, when part of airflow noise that has passed through the sound absorbing holes 711 disperses in the sound absorbing sheet 825, part of the sound energy is converted into thermal energy. When part of the sound that has passed through the sound absorbing sheet 825 disperses in the sound absorbing sheet 815, part of the sound energy is converted into thermal energy. The sound absorbing sheet 815 and the sound absorbing sheet 825 are porous members made of different materials. The sound absorbing sheet 825 may reduce sound in a lower frequency band (lower pitched sound) than the sound absorbing sheet 815 in the audible range. Examples of the material of the sound absorbing sheets 815 and 825 include ethylene-propylene-diene monomer rubber based (EPDM-based) or urethane-based foam, a glass wool material made of glass fibers, and a mineral rock wool material.

Noise Reduction Effect

Figure 20:
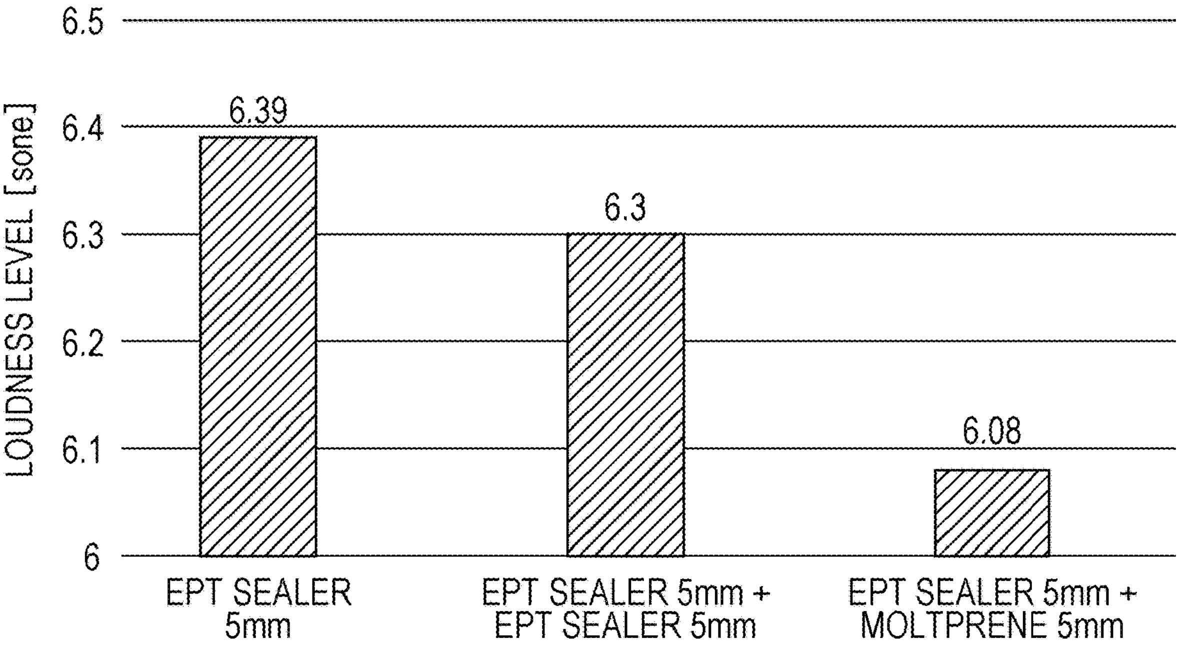
FIG. 20 is a graph showing the loudness level of airflow noise in the case where a single sound absorbing sheet is used, in the case where two sound absorbing sheets made of the same material are layered, and in the case where the first sound absorbing member according to the second embodiment is disposed.

FIG. 20 illustrates the loudness level of airflow noise when the image-formation exhaust fan 410 was operated singly in the case where one sound absorbing sheet (5-mm thick EPT sealer) was disposed, the case where two sound absorbing sheets made of the same material (5-mm thick EPT sealer+5-mm thick EPT sealer) were overlapped, and the case where the first sound absorbing member 850A was disposed. The first sound absorbing member 850A was a laminate of a 5-mm thick EPT sealer and a 5-mm thick Moltprene.

As can be understood from FIG. 20, only one 5-mm thick EPT sealer was used, the loudness level was 6.39 sone. When a 5-mm thick EPT sealer and a 5-mm thick EPT sealer was layered, the loudness level was 6.3 sone. Layering sound absorbing sheets of the same material is substantially the same as using a single thick sound absorbing sheet. Thus, the noise reduction effect varies depending on the thickness. In contrast, when the first sound absorbing member 850A was used, the loudness level was 6.08 sone. Thus, the use of the first sound absorbing member 850A with a two-layer structure consisting of laminated sound absorbing sheets made of different materials even with the same thickness provided a higher noise reduction effect.

Thus, the use of the first sound absorbing member 850A in which the sound absorbing sheets 815 and 825 made of different materials are laminated provides a higher noise reduction effect than the use of sound absorbing sheets made of the same material even if the total thickness of the two sound absorbing sheets is the same. This is because the frequency band of sound at which the sound energy is converted into thermal energy differs depending on the material of the sound absorbing sheet, as described above. In disposing a single sound absorbing sheet, the degrees of sound absorption of sound absorbing sheets made of different materials are compared, and a sound absorbing sheet of a material that has a high overall noise reduction effect is selected in consideration of the entire frequency band. However, laminating the sound absorbing sheets 815 and 825 made of different materials provides the noise reduction effect in a wider frequency band than laminating two sound absorbing sheets made of the same material having a high noise reduction effect (or increasing the thickness). In other words, in the case of the first sound absorbing member 850A, even if the total thickness of the sound absorbing sheets 815 and 825 is smaller than the thickness of two sound absorbing sheets made of the same material, the same noise reduction effect is provided.

Also in the second embodiment, a sound absorbing sheet may be additionally disposed between the first sound absorbing member 850A and the fan connecting duct 710A, as in the first embodiment. In other words, layering three or more sound absorbing sheets provides a higher noise reduction effect. However, the material of the sound absorbing sheet disposed between the first sound absorbing member 850A and the fan connecting duct 710A is at least different from the material of the sound absorbing sheet 825 of the first sound absorbing member 850A adjacent to the fan connecting duct 710A. All of three or more sound absorbing sheets may be made of different materials.

Third Embodiment

Figure 21A:
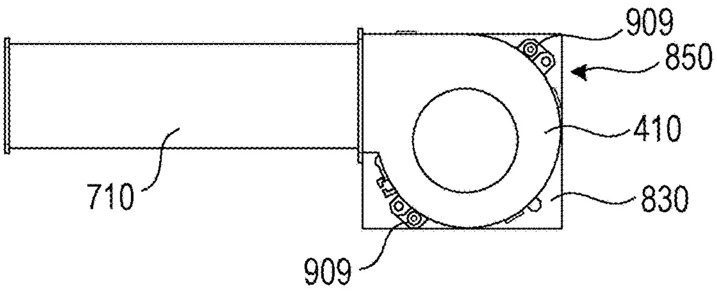
FIG. 21A is a top view of a duct unit in which a first sound absorbing member is disposed on the fan.
Figure 21B:
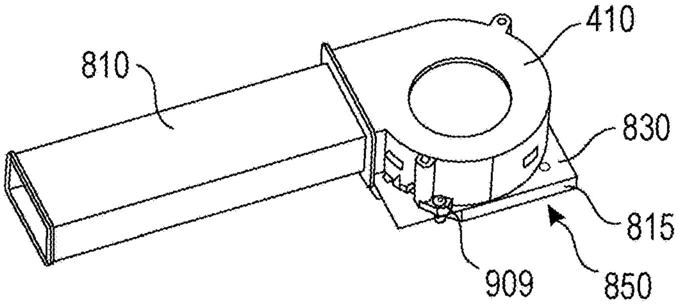
FIG. 21B is a perspective view of the duct unit.

Next, a third embodiment will be described with reference to FIGS. 21A to 21D. As illustrated in FIGS. 21A and 21B, in the third embodiment, the two-layered sound absorbing member 850 (850A) is disposed not outside the fan connecting duct 710 (710A and 710B) but outside the image-formation exhaust fan 410. The third embodiment may be the same as the first and second embodiments except that the first sound absorbing member 850 (850A) is disposed outside the image-formation exhaust fan 410, and the same reference signs are used for the same components as in the first and second embodiments, and the description is simplified or omitted.

Figure 21C:
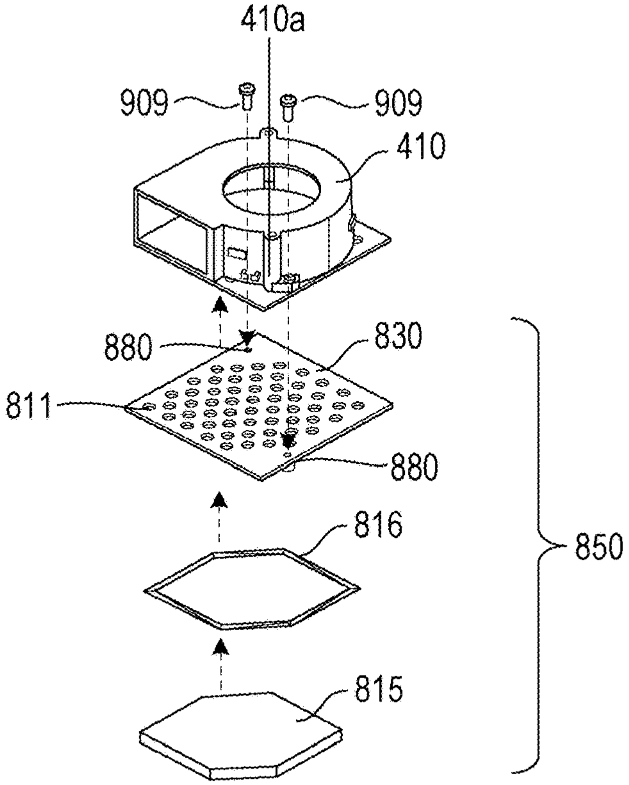
FIG. 21C is an exploded perspective view of the first sound absorbing member.
Figure 21D:
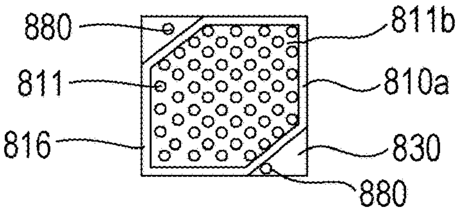
FIG. 21D is a top view of a perforated plate.

As illustrated in FIG. 21C, the first sound absorbing member 850 is a two-layered member including a perforated plate 830 having multiple sound absorbing holes 811 and a sound absorbing sheet 815 made of a material different from the material of the perforated plate 830. These sound absorbing member and sheet are layered in the axis of rotation 410*a* of the image-formation exhaust fan 410. The perforated plate 830 has self-tapping holes 880 serving as insertion holes into which a screw 909 is to be inserted. The sound absorbing sheet 815 is bonded to the surface of the perforated plate 830 opposite to the image-formation exhaust fan 410 with a double-sided tape 816 so as to cover the sound absorbing holes 811 of the perforated plate 830. However, if the sound absorbing holes 811 are partially blocked with the double-sided tape 816, the noise reduction effect using the sound absorbing holes 811 becomes less than when they are not blocked. For this reason, the double-sided tape 816 bonds the sound absorbing sheet 815 in a no-hole area 810*a* without the sound absorbing holes 811, in other words, out of an area 811*b* with the sound absorbing holes 811, as illustrated in FIG. 21D. The self-tapping holes 880 are also provided out of the area 811*b*. The first sound absorbing member 850 is mounted on the image-formation exhaust fan 410 with the screws 909 inserted in fastener holes of the image-formation exhaust fan 410 and the self-tapping holes 880 of the perforated plate 830. The self-tapping holes 880 each have an insert nut pressed in (not shown).

Thus, even if the first sound absorbing member 850 is disposed outside the image-formation exhaust fan 410, when part of the airflow noise generated by the operation of the image-formation exhaust fan 410 passes through the sound absorbing holes 811, sound energy is partially converted into thermal energy, thereby reducing the airflow noise. Furthermore, part of the sound energy of the sound that has passed through the sound absorbing holes 811 is further converted into thermal energy by the sound absorbing sheet 815, thereby further reducing the airflow noise.

Fourth Embodiment

Figure 22A:
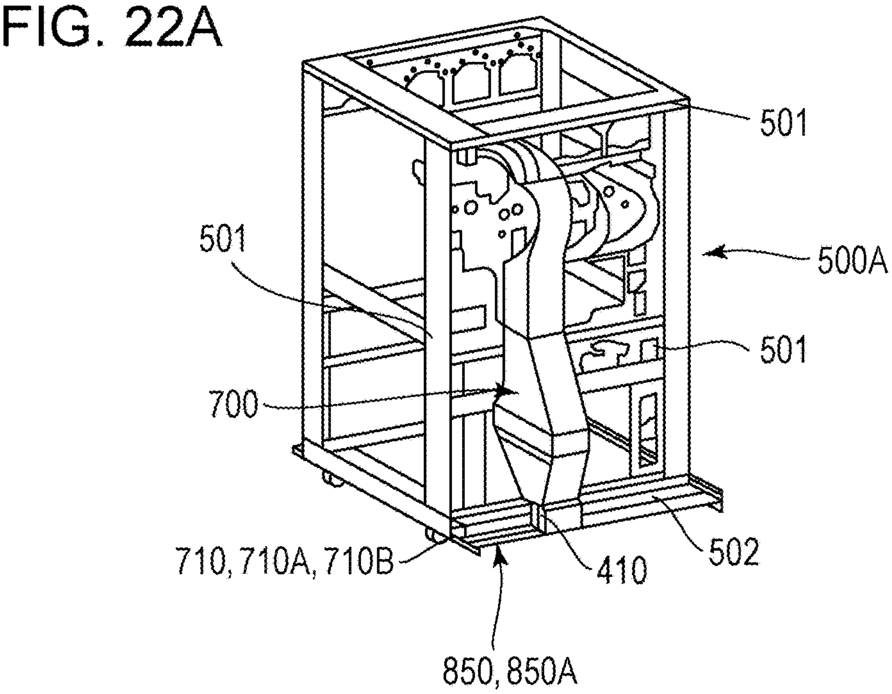
FIG. 22A is a schematic diagram of a casing in which a first sound absorbing member is supported by a bottom plate.
Figure 22B:
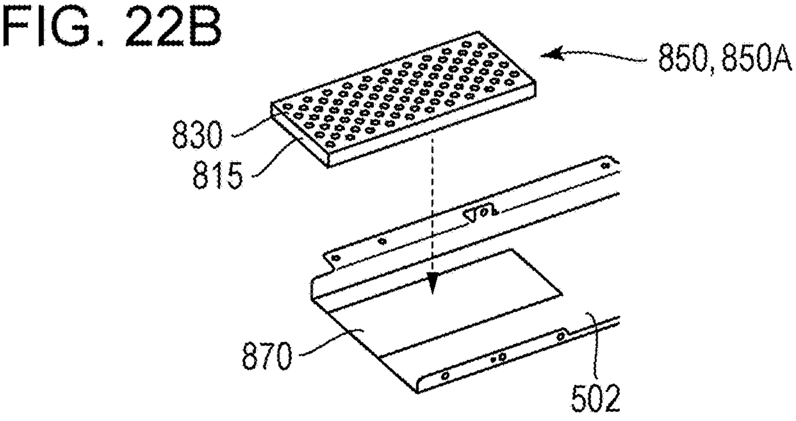
FIG. 22B is a perspective view of the first sound absorbing member supported by the bottom plate.
Figure 22C:
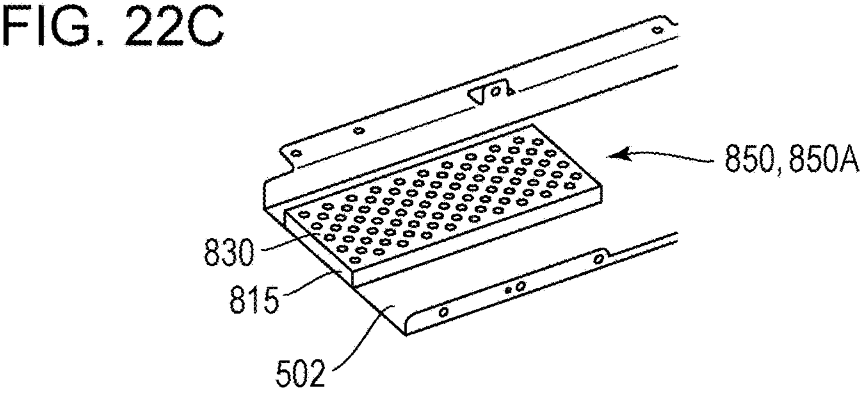
FIG. 22C is a perspective view of the bottom plate and the first sound absorbing member.

Next, a fourth embodiment will be described with reference to FIGS. 22A to 27C. As illustrated in FIG. 22A, a duct unit 700 and an image-formation exhaust fan 410 are supported by a frame 501 and a bottom plate 502 constituting a casing 500A. The two-layered sound absorbing member 850 (850A) described above is bonded to the bottom plate 502 with a double-sided tape 870 or the like in advance, with the sound absorbing sheet 815 opposed to the bottom plate 502, as illustrated in FIGS. 22B and 22C.

The position of the first sound absorbing member 850 (850A) relative to the bottom plate 502 may be opposed to one or both of the fan connecting duct 710 (710A and 710B) and the image-formation exhaust fan 410 in installing the duct unit 700 in the casing 500A. The first sound absorbing member 850 (850A) may be in contact with or spaced (for example, 3 mm) from the fan connecting duct 710 (710A and 710B) or the image-formation exhaust fan 410, with the duct unit 700 supported by the casing 500A. In the case where the first sound absorbing member 850 (850A) is in contact with the fan connecting duct 710 (710A and 710B) or the image-formation exhaust fan 410, the first sound absorbing member 850 (850A) may be bonded to the fan connecting duct 710 (710A and 710B) or the image-formation exhaust fan 410 with a double-sided tape or the like (not shown).

Figure 23A:
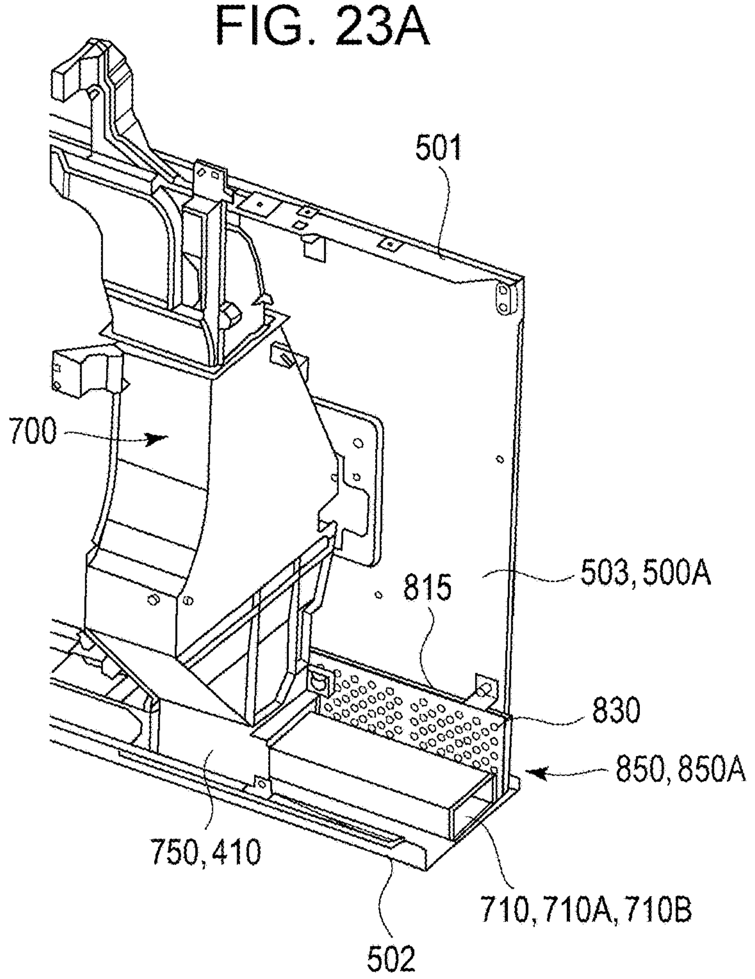
FIG. 23A is a schematic diagram illustrating a first sound absorbing member supported by a rear plate and a bottom plate.
Figure 23B:
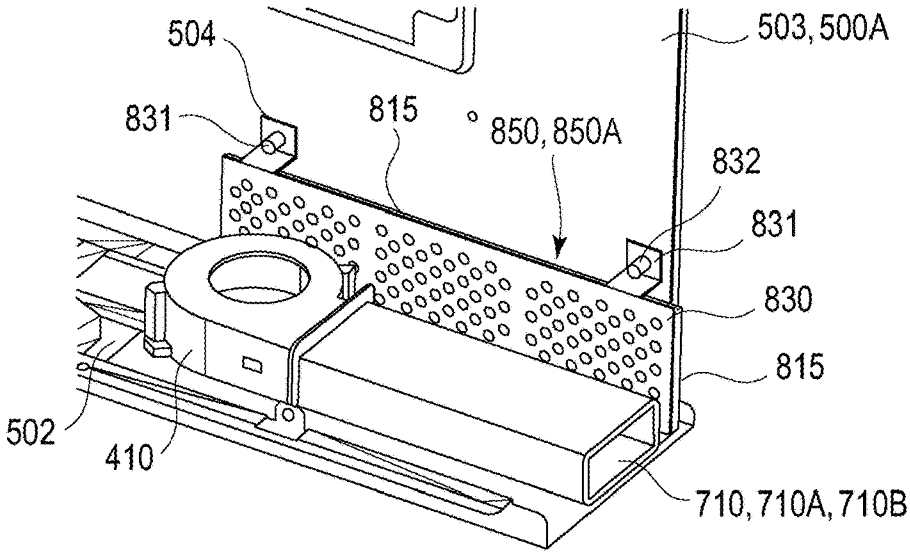
FIG. 23B is a perspective view of a fan, a fan connecting duct, and the first sound absorbing member.

Alternatively, as illustrated in FIGS. 23A and 23B, the two-layered sound absorbing member 850 (850A) may be fixed to a rear plate 503 and the bottom plate 502, with the sound absorbing sheet 815 orientated to the rear plate 503 of the casing 500A. The position of the first sound absorbing member 850 (850A) relative to the rear plate 503 and the bottom plate 502 may be opposed to one or both of the fan connecting duct 710 (710A and 710B) and the image-formation exhaust fan 410 in installing the duct unit 700 in the casing 500A. There is a space between the first sound absorbing member 850 (850A) and the fan connecting duct 710 (710A and 710B) or the image-formation exhaust fan 410, with the duct unit 700 supported by the casing 500A.

Figure 24A:
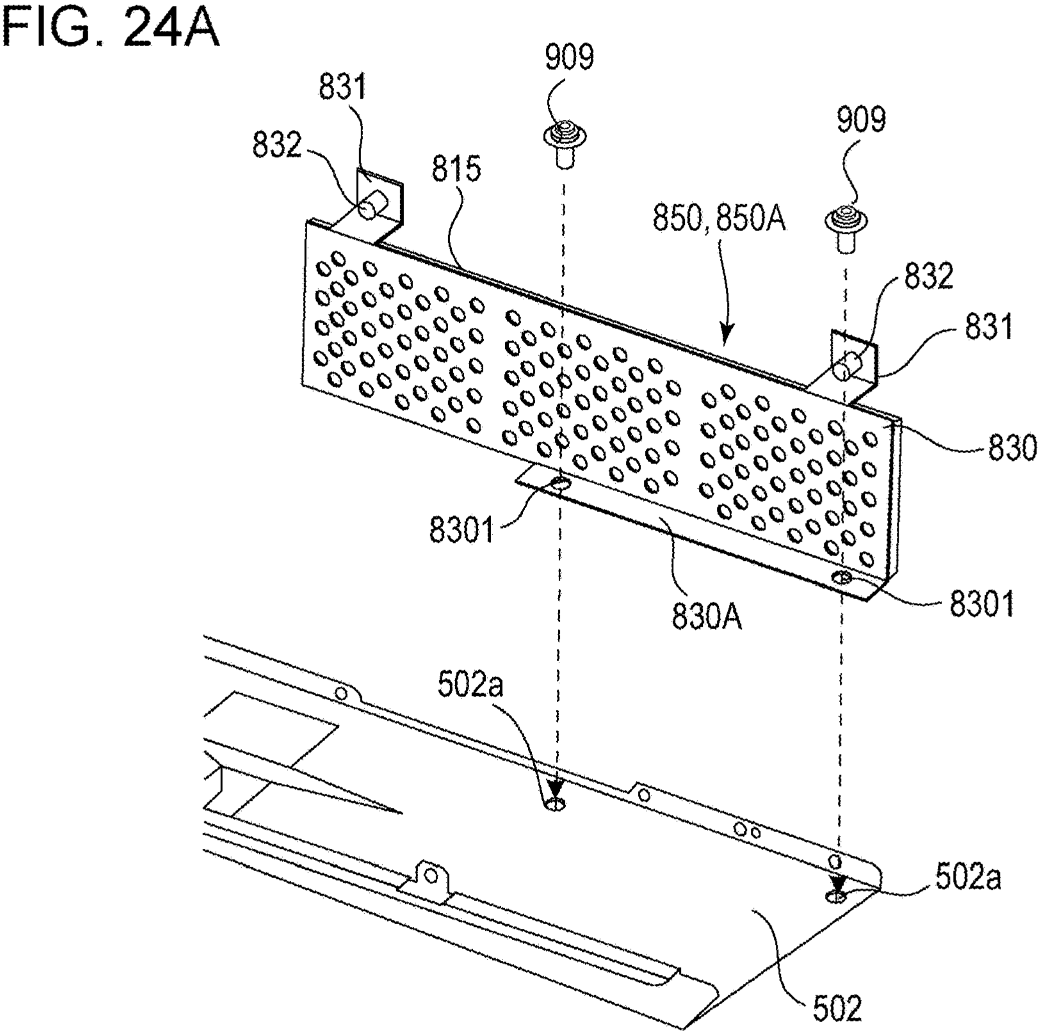
FIG. 24A is a diagram illustrating how the first sound absorbing member is attached to the bottom plate.
Figure 24B:
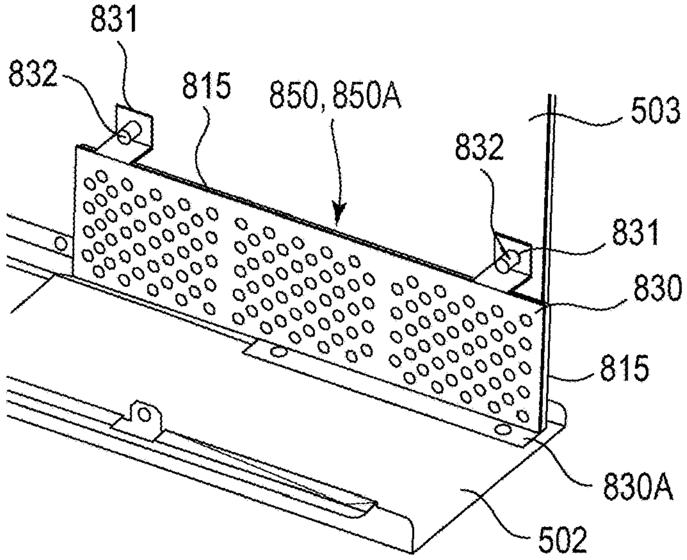
FIG. 24B is a perspective view of the first sound absorbing member attached to the bottom plate.

As illustrated in FIGS. 24A and 24B, the perforated plate 830 includes a bottom-plate fixing portion 830A, formed by bending part of the edge adjacent to the bottom plate 502 at a right angle toward the opposite side from the rear plate 503, for fixing the first sound absorbing member 850 (850A) to the bottom plate 502. The bottom-plate fixing portion 830A has screw insertion holes 8301, and the bottom plate 502 has taps 502*a* for screw fastening. The first sound absorbing member 850 (850A) is secured to the bottom plate 502 with screws 909 inserted through the screw insertion holes 8301 of the bottom-plate fixing portion 830A and fastened into the taps 502*a* in the bottom plate 502.

Figure 25A:
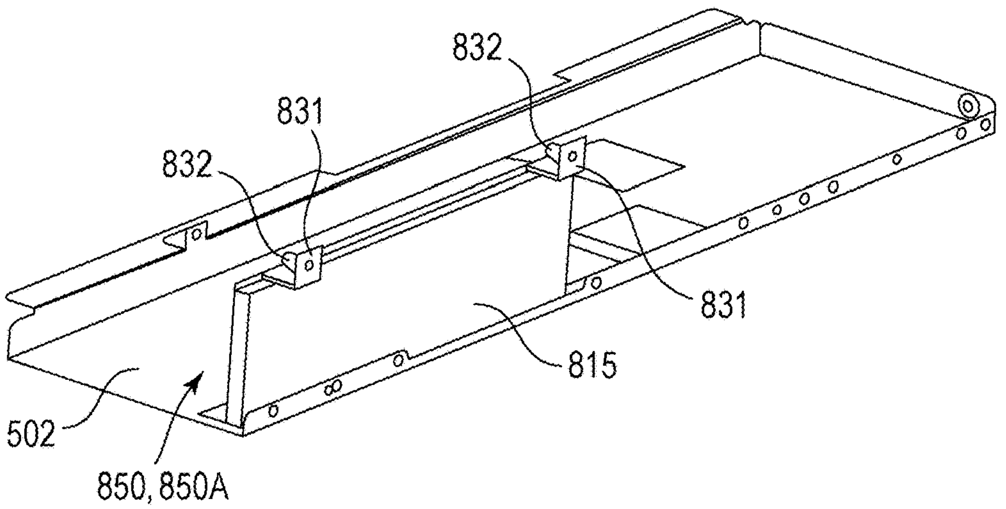
FIG. 25A is a diagram of the first sound absorbing member attached to the bottom plate viewed from the rear plate.
Figure 25B:
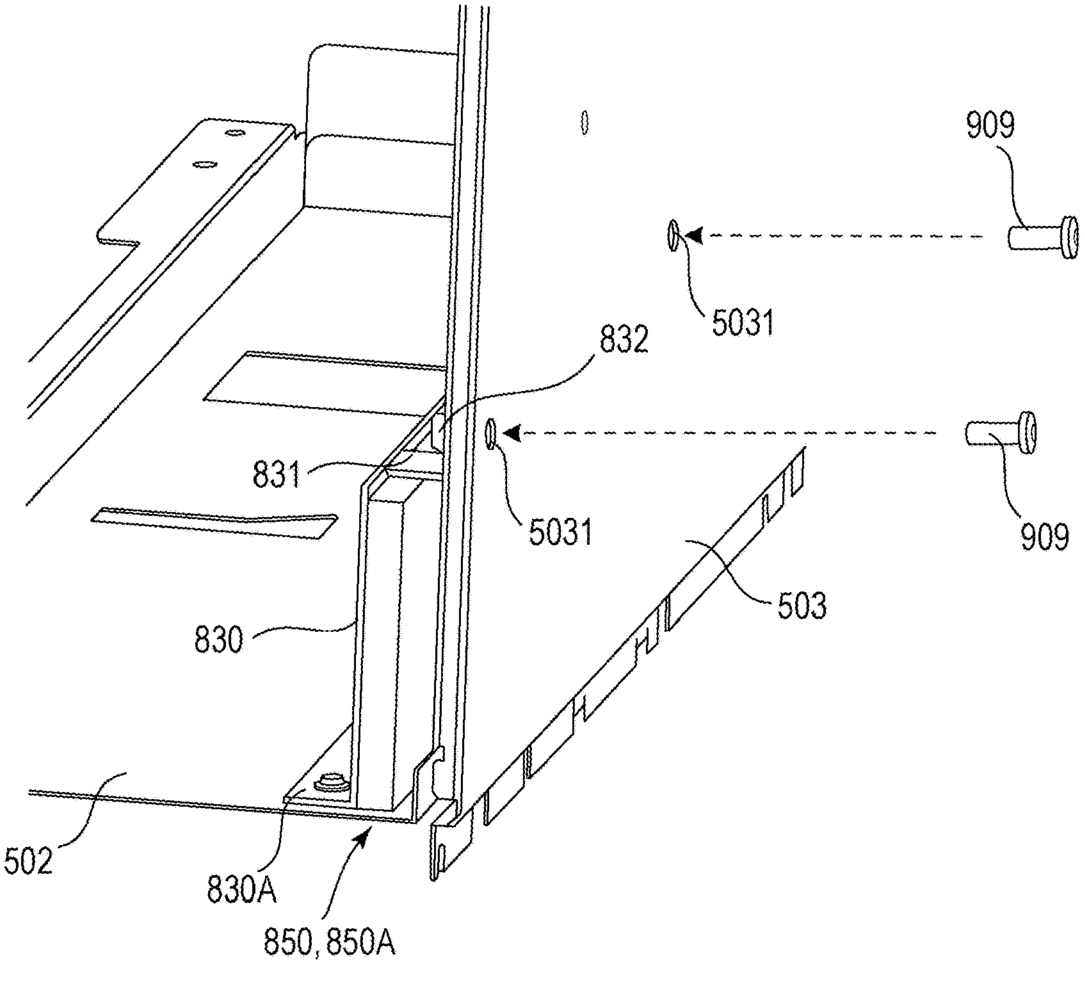
FIG. 25B is a diagram illustrating how the first sound absorbing member is attached to the rear plate.

The perforated plate 830 includes protrusions 831 protruding from the edge opposite to the bottom-plate fixing portion 830A toward the rear plate 503, for fixing the first sound absorbing member 850 (850A) to the rear plate 503. To provide a sufficient area to be in contact with the rear plate 503, the end of each protrusion 831 is bent at a right angle so as not to overlap with the sound absorbing sheet 815 and has a tap 832 for screw fastening, as illustrated in FIG. 25A. The rear plate 503 has screw insertion holes 5031, as illustrated in FIG. 25B. The first sound absorbing member 850 (850A) is secured to the rear plate 503 with the screws 909 inserted through the screw insertion holes 5031 in the rear plate 503 and fastened into the taps 832 of the protrusions 831.

Figure 26A:
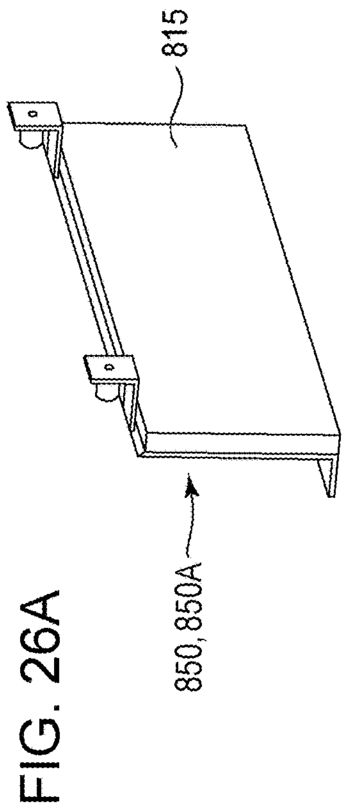
FIG. 26A is a perspective view of the first sound absorbing member viewed from the rear plate.
Figure 26B:
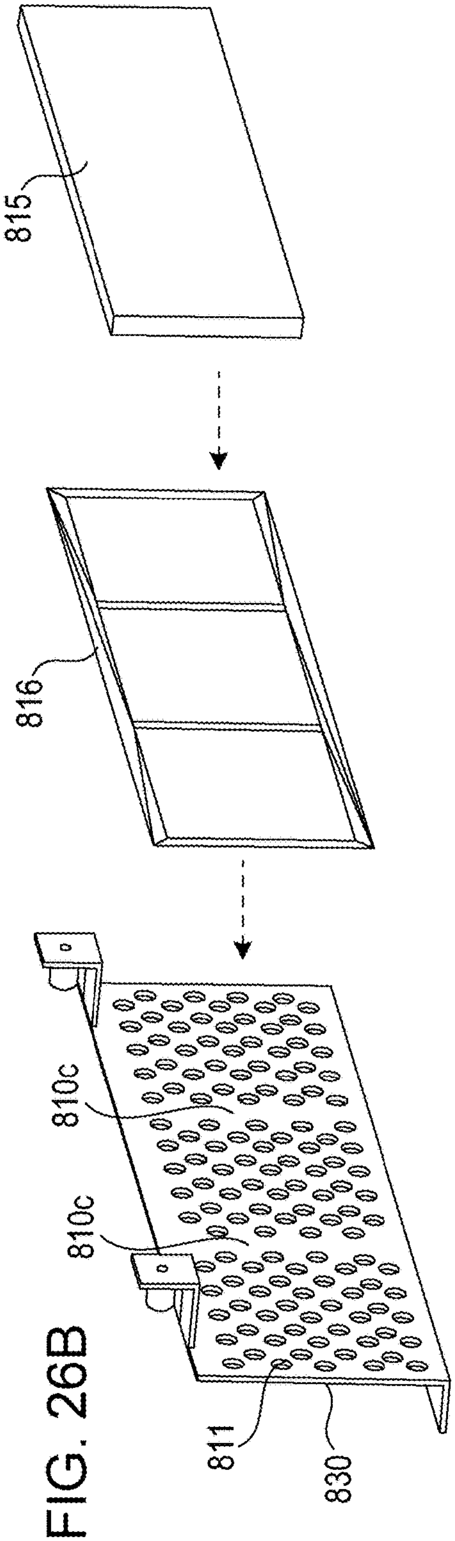
FIG. 26B is an exploded perspective view of the first sound absorbing member.
Figure 26C:
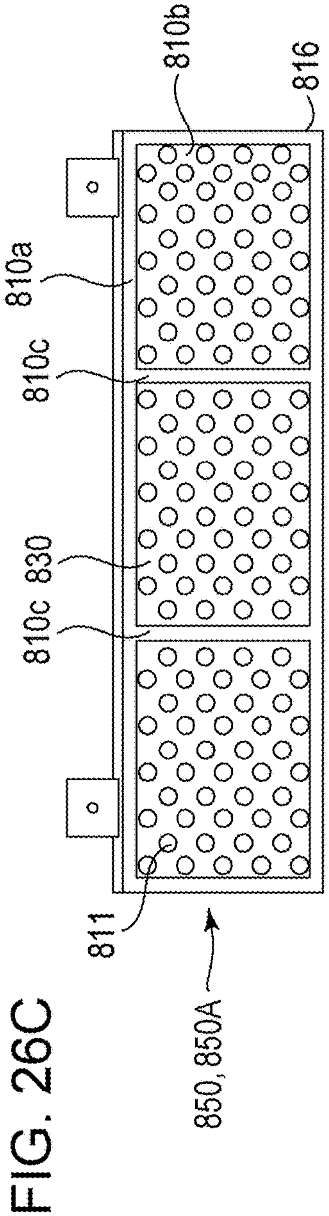
FIG. 26C is a diagram illustrating a perforated plate and a double-sided tape.

As illustrated in FIG. 26A, all of the sound absorbing holes 811 in the perforated plate 830 may be covered with the sound absorbing sheet 815. In other words, the sound absorbing sheet 815 is bonded to the perforated plate 830 with a double-sided tape 816, as illustrated in FIG. 26B. However, if the sound absorbing holes 811 are partially blocked with the double-sided tape 816, the noise reduction effect using the sound absorbing holes 811 becomes less than when they are not blocked. For this reason, the double-sided tape 816 bonds the sound absorbing sheet 815 in a no-hole area 810*a* without the sound absorbing holes 811 of the perforated plate 830, as illustrated in FIG. 26C. The double-sided tape 816 may bond the sound absorbing sheet 815 to a no-hole area 810*c* inside the edge of the perforated plate 830 in addition to the no-hole area 810*a* at the edge of the perforated plate 830.

As described above, the first sound absorbing member 850 (850A) is installed in the casing 500A in advance, and when the duct unit 700 is disposed in the casing 500A, the first sound absorbing member 850 (850A) is opposed to one or both of the fan connecting duct 710 (710A and 710B) and the image-formation exhaust fan 410. This configuration reduces the risk of damaging the first sound absorbing member 850 (850A) during the installation of the duct unit 700 in the casing 500A, even if there is limited space for the duct unit 700 in the casing 500A, compared with a case where the first sound absorbing member 850 (850A) is bonded to the fan connecting duct 710 (710A and 710B).

Other Embodiments

Figure 27:
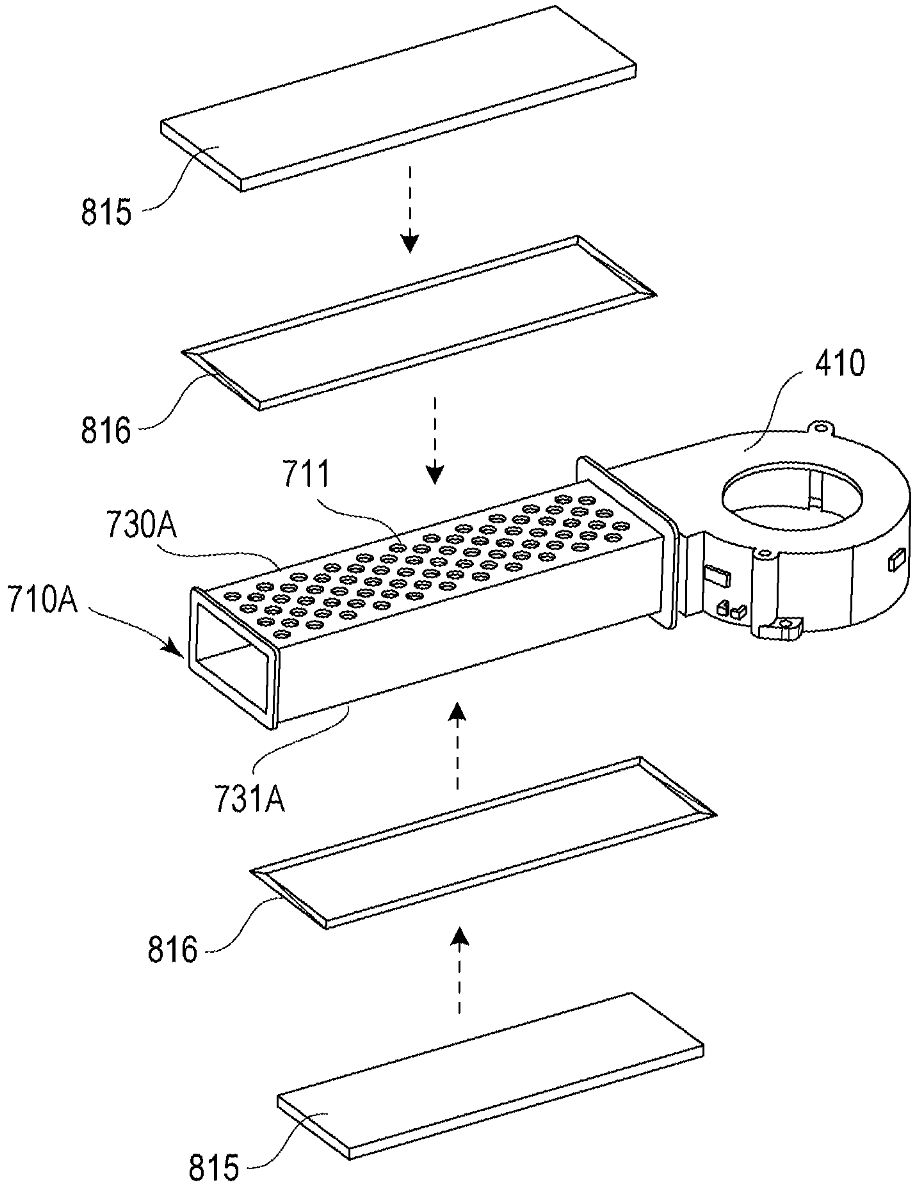
FIG. 27 is a perspective view of a perforated fan connecting duct on which sound absorbing sheets are disposed.

The fan connecting duct 710 (710A and 710B) may include only the sound absorbing sheet 815. FIG. 27 illustrates an example in which the sound absorbing sheet 815 is disposed on the perforated fan connecting duct 710A. Here, the sound absorbing sheet 815 is bonded to each of the perforated walls 730A and 731A having the sound absorbing holes 711 with the double-sided tape 816.

As described above, in the perforated fan connecting duct 710A, when the airflow noise generated by the operation of the image-formation exhaust fan 410 passes through the main body 740A, part of the airflow noise enters the sound absorbing holes 711 and vibrates, converting part of the sound energy into thermal energy, thereby reducing the airflow noise. The airflow noise can be further reduced by converting part of the sound energy that has passed through the sound absorbing holes 811 into thermal energy using the sound absorbing sheet 815.

Similarly, the sound absorbing sheet 815 may be disposed on the fan connecting duct 710B illustrated in FIGS. 16A and 16B. When airflow passes through the main body 740B, part of the airflow noise enters the recesses 715 and vibrates, converting part of the sound energy into thermal energy, thereby reducing the airflow noise. The sound absorbing sheet 815 is disposed on each of the wall surfaces 730B and 731B having the recesses 715 in the recess-formed fan connecting duct 710B. Therefore, part of the sound energy of the sound that has passed through the recesses 715 of the fan connecting duct 710B is further converted into thermal energy by the sound absorbing sheet 815, thereby reducing the airflow noise.

Although the above embodiments use a Sirocco fan as the image-formation exhaust fan 410, this is illustrative only.

Since airflow noise is generated from other fans such as an axial fan, the above embodiments may be applied to any type of fan.

The fan connecting duct 710 (710A and 710B) may be used not only for a duct disposed downstream from the image-formation exhaust fan 410 in the airflow direction but for a duct disposed upstream in the airflow direction from the image-formation exhaust fan 410 in the image-formation airflow unit 401. The fan connecting duct 710 (710A and 710B) may be used not only in the image-formation airflow unit 401 but also in other airflow units (see FIG. 3).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-120326, filed Jul. 24, 2023, which is hereby incorporated by reference herein in its entirety.

What is claimed is:

1. An image forming apparatus A duct unit comprising:
an image forming unit configured to form an image on a printing medium; and
a duct unit,
wherein the duct unit includes:
a fan configured to generate airflow;
a duct including a tubular main body that forms an air channel through which the airflow generated by the fan passes; and
a first sound absorbing member disposed outside the tubular main body along at least part of the air channel of the tubular main body,
wherein the first sound absorbing member includes a first layer and a second layer disposed on the first layer in a direction perpendicular to an outer surface of the tubular main body so that the first layer is disposed between the second layer and the outer surface of the tubular main body, and
wherein the second layer has a sound absorbing property different from a sound absorbing property of the first layer.

2. The image forming apparatus according to claim 1,
wherein the first layer includes a perforated plate having a plurality of through-holes, and
wherein the second layer includes a porous member overlapping with the plurality of through-holes.

3. The image forming apparatus according to claim 1, further comprising:
a second sound absorbing member disposed between the outer surface of the tubular main body and the first sound absorbing member in the direction perpendicular to the outer surface of the tubular main body,
wherein the second sound absorbing member has a sound absorbing property different from the sound absorbing property of the first layer.

4. The image forming apparatus according to claim 3,
wherein the first layer of the first sound absorbing member is disposed closer to the tubular main body than the second layer,
wherein the first layer includes a perforated plate having a plurality of through-holes,
wherein the second layer includes a porous member overlapping with the plurality of through-holes, and
wherein the second sound absorbing member includes a porous member overlapping with the plurality of through-holes.

5. The image forming apparatus according to claim 3, wherein the first sound absorbing member and the second sound absorbing member are in contact with each other.

6. The image forming apparatus according to claim 3, wherein the first sound absorbing member and the second sound absorbing member are disposed away from each other.

7. The image forming apparatus according to claim 1, wherein the first layer and the second layer individually include porous members which are made of different materials.

8. The image forming apparatus according to claim 1,
wherein the tubular main body includes a perforated wall having a plurality of through-holes, and
wherein the first sound absorbing member is disposed outside the perforated wall in a direction perpendicular to the perforated wall.

9. The image forming apparatus according to claim 1,
wherein the tubular main body includes a recessed wall having a plurality of recesses, and
wherein the first sound absorbing member is disposed outside the recessed wall in a direction perpendicular to the recessed wall.

10. The image forming apparatus according to claim 1,
wherein the tubular main body includes a plurality of surfaces that are polygonal in cross-section of the tubular main body, and
wherein the first sound absorbing member is disposed on at least one of the plurality of surfaces.

11. The image forming apparatus according to claim 1,
wherein the tubular main body and the first sound absorbing member are detachable from each other,
wherein the tubular main body includes a first retaining portion, and
wherein the first sound absorbing member includes a second retaining portion configured to engage with the first retaining portion when mounted on the tubular main body.

12. The image forming apparatus according to claim 1,
wherein the duct is disposed downstream from the fan in an airflow direction,
wherein the duct includes an inlet through which air flows into the tubular main body and an outlet through which the air flows out, and
wherein the fan is connected to the inlet of the tubular main body.

13. The image forming apparatus according to claim 1, wherein the fan includes a Sirocco fan.

14. The image forming apparatus according to claim 1, further comprising:
a casing; and
a fan configured to generate airflow in the duct unit,
wherein the first sound absorbing member is fixed to the casing so as to be disposed outside the tubular main body along at least part of the air channel of the tubular main body.

15. An image forming apparatus comprising:
an image forming unit configured to form an image on a printing medium; and
a duct unit,
wherein the duct unit includes:
a fan configured to generate airflow;
a duct including a tubular main body that forms an air channel through which the airflow generated by the fan passes; and
a first sound absorbing member disposed outside the fan,
wherein the first sound absorbing member includes a first layer and a second layer disposed on the first layer in a direction perpendicular to an outer surface of the tubular main body so that the first layer is disposed between the second layer and the outer surface of the tubular main body, and wherein the second layer has a sound absorbing property different from a sound absorbing property of the first layer.

16. A duct unit comprising:

a fan configured to generate airflow;

a duct including a tubular main body that forms an air channel through which the airflow generated by the fan passes; and a first sound absorbing member disposed outside the tubular main body along at least part of the air channel of the tubular main body, wherein the tubular main body includes a recessed wall having a plurality of recesses which are not penetrating through the recessed wall, and wherein the first sound absorbing member is disposed outside the recessed wall.

17. An image forming apparatus comprising:

an image forming unit configured to form an image on a printing medium; and the duct unit according to claim 16.

18. A duct unit comprising:

a fan configured to generate airflow;

a duct including a tubular main body that forms an air channel through which the airflow generated by the fan passes; and a first sound absorbing member disposed outside the tubular main body along at least part of the air channel of the tubular main body, wherein the first sound absorbing member includes a first layer and a second layer disposed on the first layer in a direction perpendicular to an outer surface of the tubular main body so that the first layer is disposed between the second layer and the outer surface of the tubular main body, wherein the second layer has a sound absorbing property different from a sound absorbing property of the first layer, wherein the tubular main body includes a perforated wall having a plurality of through-holes, and wherein the first sound absorbing member is disposed outside the perforated wall in a direction perpendicular to the perforated wall.

19. The duct unit according to claim 18, further comprising:

a second sound absorbing member disposed between the outer surface of the tubular main body and the first sound absorbing member in the direction perpendicular to the outer surface of the tubular main body, wherein the second sound absorbing member has a sound absorbing property different from the sound absorbing property of the first layer.

20. The duct unit according to claim 18, wherein the first layer and the second layer individually include porous members which are made of different materials.

21. The duct unit according to claim 18, wherein the tubular main body includes a plurality of surfaces that are polygonal in cross-section of the tubular main body, and wherein the first sound absorbing member is disposed on at least one of the plurality of surfaces.

22. The duct unit according to claim 18, wherein the tubular main body and the first sound absorbing member are detachable from each other, wherein the tubular main body includes a first retaining portion, and wherein the first sound absorbing member includes a second retaining portion configured to engage with the first retaining portion when mounted on the tubular main body.

23. A duct unit comprising:

a fan configured to generate airflow;

a duct including a tubular main body that forms an air channel through which the airflow generated by the fan passes; and a first sound absorbing member disposed outside the tubular main body along at least part of the air channel of the tubular main body, wherein the first sound absorbing member includes a first layer and a second layer disposed on the first layer in a direction perpendicular to an outer surface of the tubular main body so that the first layer is disposed between the second layer and the outer surface of the tubular main body, wherein the second layer has a sound absorbing property different from a sound absorbing property of the first layer, wherein the tubular main body includes a plurality of surfaces that are polygonal in cross-section of the tubular main body, and wherein the first sound absorbing member is disposed on at least one of the plurality of surfaces.

24. The duct unit according to claim 23, further comprising:

a second sound absorbing member disposed between the outer surface of the tubular main body and the first sound absorbing member in the direction perpendicular to the outer surface of the tubular main body, wherein the second sound absorbing member has a sound absorbing property different from the sound absorbing property of the first layer.

25. The duct unit according to claim 23, wherein the first layer and the second layer individually include porous members which are made of different materials.

26. The duct unit according to claim 23, wherein the tubular main body includes a perforated wall having a plurality of through-holes, and wherein the first sound absorbing member is disposed outside the perforated wall in a direction perpendicular to the perforated wall.

27. The duct unit according to claim 23, wherein the tubular main body and the first sound absorbing member are detachable from each other, wherein the tubular main body includes a first retaining portion, and wherein the first sound absorbing member includes a second retaining portion configured to engage with the first retaining portion when mounted on the tubular main body.

* * * * *